(12) United States Patent
Lightfoot et al.

(10) Patent No.: US 7,022,998 B2
(45) Date of Patent: Apr. 4, 2006

(54) RADIATION DOSE RATE MEASUREMENT

(75) Inventors: John Adrian Lightfoot, Calderbridge (GB); Karl Anthony Hughes, Calderbridge (GB)

(73) Assignee: British Nuclear Fuels PLC, Risley (GB)

( * ) Notice: Subject to any disclaimer, the term of this patent is extended or adjusted under 35 U.S.C. 154(b) by 0 days.

(21) Appl. No.: 10/850,074

(22) Filed: May 19, 2004

(65) Prior Publication Data

US 2004/0211912 A1    Oct. 28, 2004

Related U.S. Application Data

(63) Continuation of application No. 10/263,938, filed on Oct. 2, 2002, now abandoned, which is a continuation of application No. 09/403,211, filed as application No. PCT/GB98/01398 on May 15, 1998, now abandoned.

(30) Foreign Application Priority Data

May 15, 1997    (GB)    ................................ 9709817

(51) Int. Cl.
  *G01T 1/00*    (2006.01)
(52) U.S. Cl. ............. 250/394; 250/393; 250/336.1; 250/253
(58) Field of Classification Search ........... 250/394, 250/393, 336.1, 253
  See application file for complete search history.

(56) References Cited

U.S. PATENT DOCUMENTS 3,270,205 A * 8/1966 Ladd et al. ............... 327/70
4,187,908 A * 2/1980 Fertl et al. ............... 166/254.2
4,827,132 A   5/1989 Moscovitch
5,204,533 A   4/1993 Simonet
5,286,973 A * 2/1994 Westrom et al. ........... 250/253

FOREIGN PATENT DOCUMENTS

EP    0 542 561 A1    5/1993
EP    0 743 538 A2    11/1996

OTHER PUBLICATIONS

Redus et al., An Imaging Nuclear Survey System, Jun. 1996, IEEE. Trans. Nucl. Sci. vol. 43 No. 3 p. 1827-1831.
Chesnokov et al., Determination of surface activity and radiation spectrum characteristics inside buildings by a gamma locator, Apr. 14, 1997, Nuclear Instruments and Methods in Physics Research. A 401 p. 414-420.

(Continued)

*Primary Examiner*—David Porta
*Assistant Examiner*—Shun Lee
(74) *Attorney, Agent, or Firm*—Workman Nydegger

(57) ABSTRACT

A method and apparatus are provided for determining radiation dose rates at selected locations within an environment. Incident gamma ray energy and count rate are measured at one or more measured locations within the environment to obtain a measured spectrum for those measured locations. The spatial position of the measured locations is also measured. An emitted spectrum is then determined for the measured locations based on the measured spectrum. The emitted spectrum may then be used to determine the dose rate at one or more selected locations (which may be different than the measured locations). In this way the invention provides an accurate solution for the dose rate at any point of interest within the environment based on the measured count and incident energies.

16 Claims, 19 Drawing Sheets

OTHER PUBLICATIONS

Cho et al., Electronic Dose Conversion Technique Using a NaI(TI) Detector for Assessment of Exposure Dose Rate from Environmental Radiation, Jun. 1998, IEEE. Trans. Nucl. Sci. vol. 45 No. 3 p. 981-985.

* cited by examiner

| RadScan 600 Form at 1.0a | | | | | | | | |
|---|---|---|---|---|---|---|---|---|
| Pan Pts | Tilt Pts | Pan Pitch | Tilt Pitch | Start Pan | Start Tilt | | | |
| 10 | 9 | 2.6 | 2.6 | -10.9 | -11.5 | | | |
| point | pan | tilt | range | counter | roi1 | roi2 | roi3 | |
| 1 | -11 | 11.7 | 0.7 | 15 | 313 | 72 | | 3 |
| 2 | -8.4 | 11.7 | 1.2 | 26 | 353 | 85 | | 4 |
| 3 | -5.7 | 11.7 | 1.4 | 37 | 351 | 83 | | 3 |
| 4 | -3.1 | 11.7 | 1.6 | 46 | 363 | 115 | | 4 |
| 5 | -0.6 | 11.7 | 1.6 | 57 | 319 | 98 | | 3 |
| 6 | 2 | 11.7 | 1.6 | 262 | 338 | 89 | | 4 |
| 7 | 4.7 | 11.7 | 1.5 | 273 | 369 | 91 | | 3 |
| 8 | 7.3 | 11.7 | 1.5 | 281 | 304 | 84 | | 4 |
| 9 | 9.8 | 11.7 | 1.5 | 292 | 265 | 75 | | 3 |
| 10 | 12.5 | 11.7 | 1.5 | 301 | 274 | 77 | | 3 |
| 11 | 12.5 | 9.1 | 1.5 | 310 | 201 | 60 | | 2 |
| 12 | 10 | 9.1 | 1.5 | 515 | 205 | 54 | | 3 |
| 13 | 7.4 | 9.1 | 1.5 | 524 | 311 | 67 | | 3 |
| 14 | 4.8 | 9 | 1.5 | 532 | 451 | 80 | | 3 |
| 15 | 2.2 | 9.1 | 1.6 | 541 | 339 | 88 | | 2 |
| 16 | -0.4 | 9 | 1.6 | 550 | 316 | 90 | | 3 |
| 17 | -3 | 9 | 1.7 | 559 | 365 | 87 | | 4 |

FIG. 2

RADIATION DOSE RATE MEASUREMENT

CROSS-REFERENCE TO RELATED APPLICATIONS

This is a Continuation application of application Ser. No. 10/263,938 filed Oct. 2, 2002, now abandoned, which was a Continuation application of application Ser. No. 09/403,211 filed Dec. 6, 1999, now abandoned, which was the U.S. National Phase of International Application No. PCT/GB98/01398 filed on May 15, 1998 which designated the United States, of which the disclosures of all three are incorporated herein by reference in their entirety.

BACKGROUND OF THE INVENTION

This invention concerns improvements in and relating to monitoring, particularly the monitoring of radiation dose and dose rate.

Three principle ways of expressing radiometric measurements exist, namely activity, count and dose.

In general terms activity is a measure of the amount of radioactive material present within an environment. Activity is measured in Becquerels (Bq) where 1 Bq is 1 nuclear disintegration per second.

Counts relate to the counting rate of a radiation detector, such as a scintillator, in a gamma flux. The count rate equates to the number of gamma photons depositing some energy in the detector in each second. By recording such information over a period of time a recorded spectrum relating to the given energy range is obtained.

Dose relates to the interaction of gamma rays with living tissue. Dose is a measurement of the energy deposited in the tissue by gamma ray flux and is measured in Sieverts (Sv) where 1 Sv is 1 Joule per kilo. Dose relates to a specific spatial point and is derived from all gamma rays arriving at that point. Dose rate is proportional to the number and energy of the gamma photons arriving at a point in a second. Dose and dose rate measurements are of fundamental importance in the nuclear industry and in other radiological environments as they are the basis of most health and safety legislation relating to working environments and exposure.

Instruments exist which allow the determination of dose at a point in space. However, each such system relies on a detector for gamma flux being presented to the particular point for which the dose or dose rate determination is required. Thus in determining the dose or dose rate variation for a substantial volume a very large number of measurements are required. Unfortunately, the dose at any one particular point is unrelated to the dose at other points within an

SUMMARY OF THE INVENTION

The present invention aims to provide an instrument which is capable of allowing dose, dose rate or an approximation thereto to be determined for an environment by scanning such an environment and without presenting a detector at that location.

According to a first aspect of the invention we provide a method for determining dose rate for one or more selected locations within an environment, comprising the steps of:
a) measuring incident gamma ray energy and count rate for one or more measured locations within the environment to obtain a measured spectrum for those measured locations;
b) measuring the spatial position of the measured locations;
c) determining an emitted spectrum for the measured locations from the measured spectrum;
d) inputting the emitted spectrum and measured location information to data processing means; and
e) determining the dose rate at one or more selected locations from the calculated total gamma ray energy incident on those one or more selected locations arising from the emitted spectrum of the measured locations.

In this way the invention provides an accurate solution for the dose rate at any point of interest within the environment based on the measured count and incident energies.

Preferably the measured count is determined using a remote controlled assembly. Preferably the assembly includes a gamma detector, for instance of the scintillator or semiconductor type. A caesium iodide scintillator offers one such device. Preferably the gamma detector is collimated. In this way directional sensitivity is provided. The collimator may be of tungsten. Preferably the collimator provides a plane angle of between 10 and 1 degrees. A series of collimators of discrete values may be provide. Suitable angles include 2, 4 and 9 degrees.

The assembly may further include a video camera to provide visual images of the environment to the user. The video images may include details of the area under investigation by the collimated detector. Recordal facilities for the video images may be provided.

Preferably the gamma detector can be moved to view different portions of the environment. A tilt and/or pan movement may be provided for the detector and collimator.

Preferably the gamma detector measures a plurality of different energy ranges within the spectra under consideration. Preferably the regions of interest provide a continuous sequence for analysis across the spectra range of interest.

Preferably the gamma detector analyses a location within the environment and then analyses further locations within the environment. Preferably the gamma detector scans from one location to the next. A raster style scan is preferred.

Preferably the gamma detector analyses locations within the environment equally. Analysis may be provided by analysing locations equally spaced from one another in terms of pan angle and/or tilt angle. More equal analysis may be provided by weighting analyzed locations in an environment. Preferably more locations are sampled at or towards the equator of the detector scan than at or towards the poles of the detector scan. Preferably the number of analyzed locations in the pan direction at varying tilt angles is proportional to the cosine of the tilt angle. The number of analyzed locations in the pan direction, at a given tilt angle, may vary from a maximum at the equator to one or zero locations at the pole or poles.

Preferably the gamma detector is fixedly directed at the location to be monitored during analysis of that location.

Preferably a given location may overlap or at least abut an adjoining location. A separation between measured locations may be tolerated. Additional consideration of certain areas may be provided within the environment to determine whether those areas, for instance hot spots, are attributable to point source or spread area source types. The source type has a significant effect on the dose near to those locations, but such a technique may avoid over detailed scanning were it is not needed to achieve the required accuracy. Additional scanning of such locations may be conducted using a collimator with a reduced plane angle. Alternatively or additionally measurements may be conducted by advancing the area considered by less than the plane angle of the collimator. Over sampling in this way may provide increased spatial resolution.

Preferably generally circular areas, or projections of a circular area are determined. The environment may be scanned in a series of rows and/or columns.

The environment or portions thereof may be scanned from a series of detector locations. The relationship between the detector locations is preferably determined. Moving the detector from one location to another allows full inspection of an environment, for instance behind objects obscuring parts of the environment from a first position.

The source location may be considered as a discrete point or as an area. The source results evaluated may be attributed to the area or to a discrete point, such as its centre, or a series of points within the area. The area or points to which a source is attributed may be a function of the viewing angle of the collimator relative to that area and/or the range from the collimator of that area.

The location position is preferably determined in three dimensions. The location may be determined by the tilt and pan position of the gamma detector. The location may also be determined in terms of the locations distance from the gamma detector. The method may employ a range finding device to determine the location distance. A laser range finder may be employed. Preferably a position based on the combined information is employed. The positional information may be converted to Cartesian coordinates for further processing.

Preferably the measured spectra is divided into a series of energy ranges. Preferably the ranges are continuous with one another. Preferably the ranges are of equivalent extent to one another. Preferably energy ranges of 100 keV divisions are employed. Preferably the count rates falling within a range are summed to give a total count for that range.

Preferably the ranged or binned measured spectra is analyzed to determine the contributing energies.

The analysis may comprise spectrum stripping. Preferably the analysis is performed on the highest energy level bin first. Preferably each remaining bin is then analyzed in descending energy order.

Preferably an energy bin is analyzed by subtracting from the spectrum a value based on a response function multiplied by a variable factor to reduce the bin under analysis to zero. Preferably the highest remaining energy bin still contributing to the spectra after subtraction is analyzed next. Preferably the process is repeated to reduce the complete spectra to zero.

Preferably in the bin analysis each bin is considered as having the energy level of its mid point.

The response function may be an indication of the detector response to a mono-energetic source having an energy corresponding to the mid point energy for the bin under analysis.

Preferably the response function used in the analysis is a function of the energy value under consideration. Preferably the response functions are predetermined for the method. The response functions may be determined by modelling of the apparatus used for the method. The response values may be predetermined by evaluating the response of the detection method to a range of gamma ray energies. Preferably the response is evaluated for each energy bin employed in the analysis. Preferably a response every 100 keV is determined. Preferably a range of response in the range 50 keV to 1450 keV is determined, most preferably in 100 keV steps.

Preferably the variable factor is adjusted to equate its multiple with the response factor to the bin under analysis.

The subtraction of the bin from the spectrum may also lead to subtraction or reduction in the remaining contribution to the spectrum in other bins.

The analysis of the binned spectra may comprise an iterative process.

A determination may be made based on a comparison of the response functions multiplied by variable factors with a measured spectrum.

The fit at one set of variable factors may be compared with the fit at a different set of variable factors. A further set of variable factors may be considered against the measured spectrum. The further set of variable factor values may be determined by the relative result of a preceding set or sets of variable factors to the measured spectrum.

The comparison may be based on a goodness of fit test, such as a chi-squared test. Comparisons may be continued with variations in the variable factor values until the difference between generated and measured spectrum is minimized or reduced below a given threshold.

The value of the variable factor for one or more response functions may be varied between sets.

Preferably the variable factor determined for each response value gives the emitted spectrum. Preferably the emitted spectrum is the summation of the multiples of each response function by its variable factor.

The analysis of the spectra may be conducted by a spreadsheet software package.

Preferably the analysis results in one or more emission energy values and an intensity value for each emission energy value. Preferably the analysis results are considered as the emitted spectra.

The process may be repeated for a plurality and more preferably all of the discrete locations.

The data processing means may comprise specific machine code or spreadsheets or other software or hardware intended to calculate dose based on separations and spectra. The processing means may accommodate information relating to the spatial configuration of the environment.

The source locations and intensities or spectra may be inputted to a computer model of the environment under analysis. Preferably the source locations are attributed to surfaces within the modelled environment.

The processing means or model may determine dose and/or dose rates based on calculation of the behaviour/effect of a large number of photons from each source according to its characteristics. For dose rate, for instance, the number and type of those photons incident on the location may be considered. The location may be evaluated as a volume.

The processing means or model may attribute each source spectra to a point source within the environment. Such a system may determine dose and/or dose rate based on the use of flux to dose conversion factors.

Preferably the processing means or model provides visualisation of the environment and/or the source locations and/or the source types and/or diagnostic information on the source. The visualisation may be provided in three and/or two dimensions. The visualisation may include video images of the environment.

Preferably the processing means or model accounts for the shape and/or relative position and/or shielding effect and/or attenuating effect and/or dissipating effect and/or first order scattering effect and/or second order scattering effect of the components of the environment.

The dose rate at a location is preferably determined by summing the contribution of all the source locations emitted spectra determined to that point. The dose rate can be determined for any point within the environment based on the source information determined by the analysis and the distance of the location from each of the sources. The model or processing means may account for environmental effects on the emitted spectra from the various locations and contributing to that point.

The dose rate calculated for a plurality of locations within the environment may be used to generate contour or other plots of dose rate over a part or the whole of the environment. The plots may be presented in 2D or 3D, for instance 2D slices through the environment.

The environment may be any one or more of a vessel, a container, a room, a building, a stack, a location or any other volume desiring analysis.

According to a second aspect of the invention we provide dose rate determining apparatus for one or more selected locations within an environment, the apparatus comprising:
  a) means for measuring incident gamma ray energy and count rate for one or more measured locations within the environment, the apparatus obtaining a measured spectrum for the measured locations from this information;
  b) means for measuring the spatial position of the measured locations;
  c) calculating means for determining an emitted spectrum for the measured locations based on the measured spectrum for the measured locations;
  d) processing means adapted to receive inputs corresponding to the emitted spectrum and measured location information; and
  e) calculating means for determining the dose rate at one or more selected locations from the total calculated gamma ray energy incident on those selected location arising from the emitted spectrum of the measured locations.

The apparatus may include means or devices for performing or embodying any of the process and method steps described elsewhere in this application. The apparatus may include details of apparatus set out in the first aspect of the invention. The processing means and calculating means may be on and the same.

BRIEF DESCRIPTIONS OF THE DRAWINGS

Various embodiments of the invention will now be described by way of example only, and with reference to the accompanying drawings in which:

FIG. 2 illustrates output information from the measuring apparatus;

Figure 16:
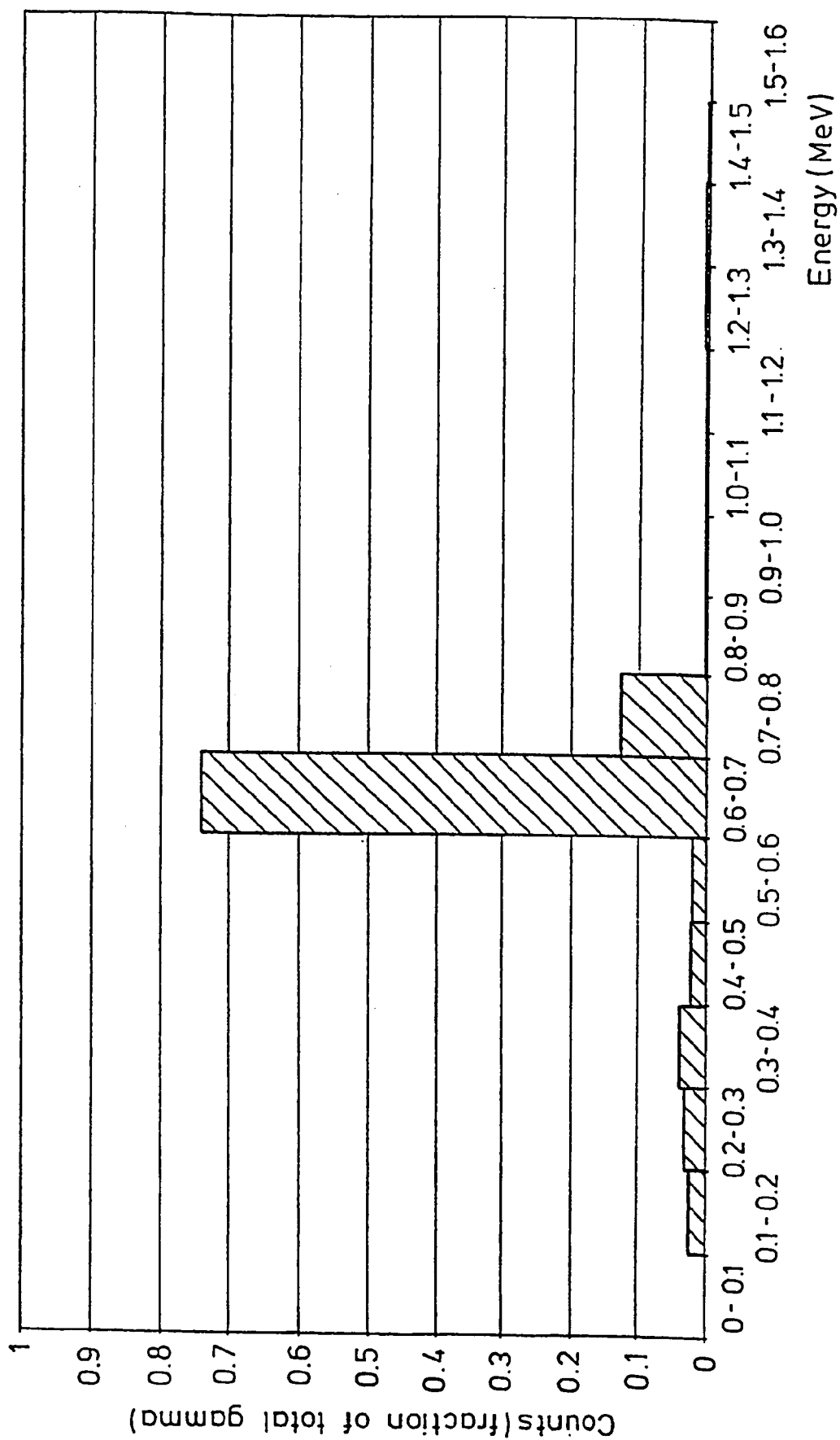
FIG. 16 shows an emitted spectra obtained from processing the spectra of FIG. 13.
Figure 17:
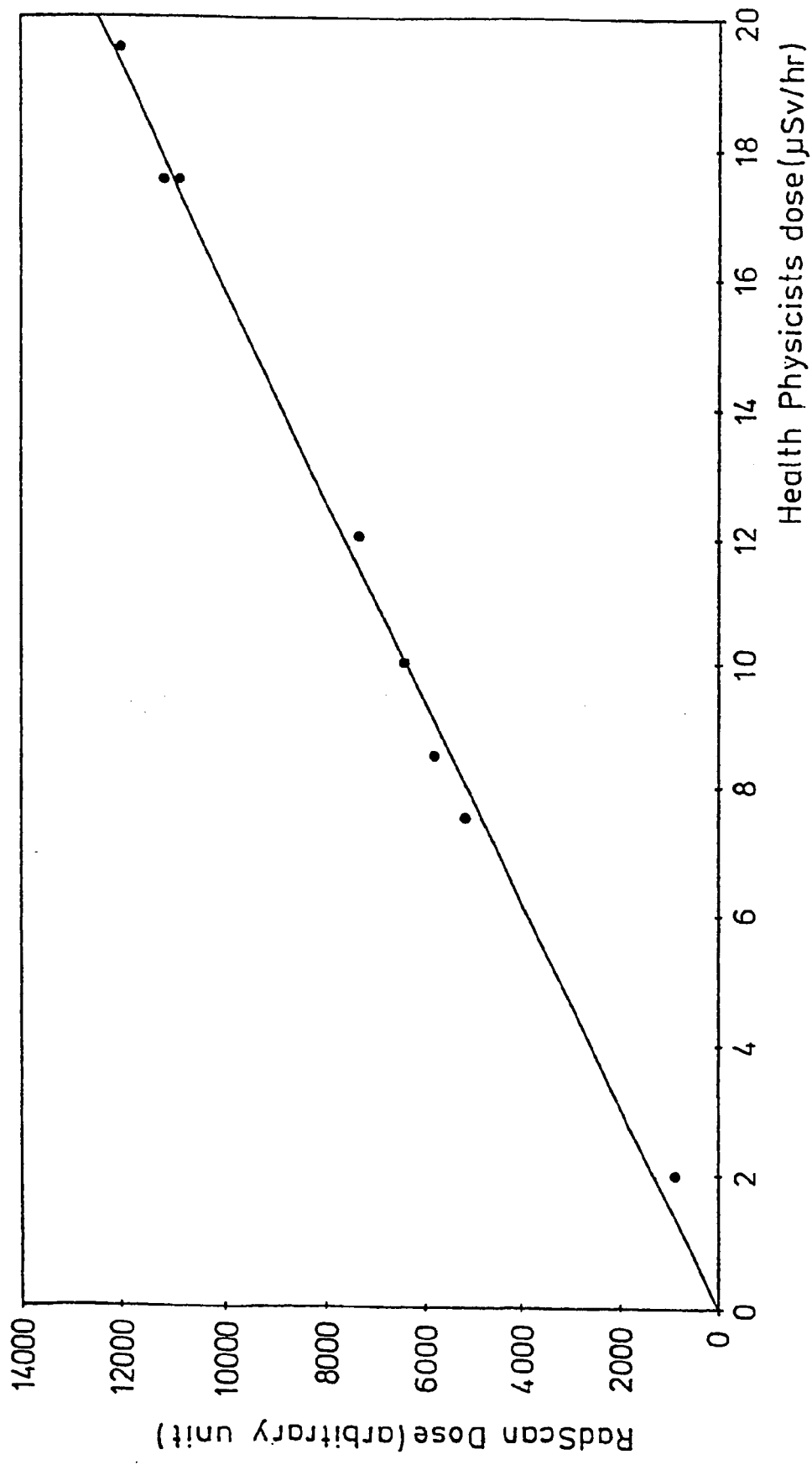
Figure 18:
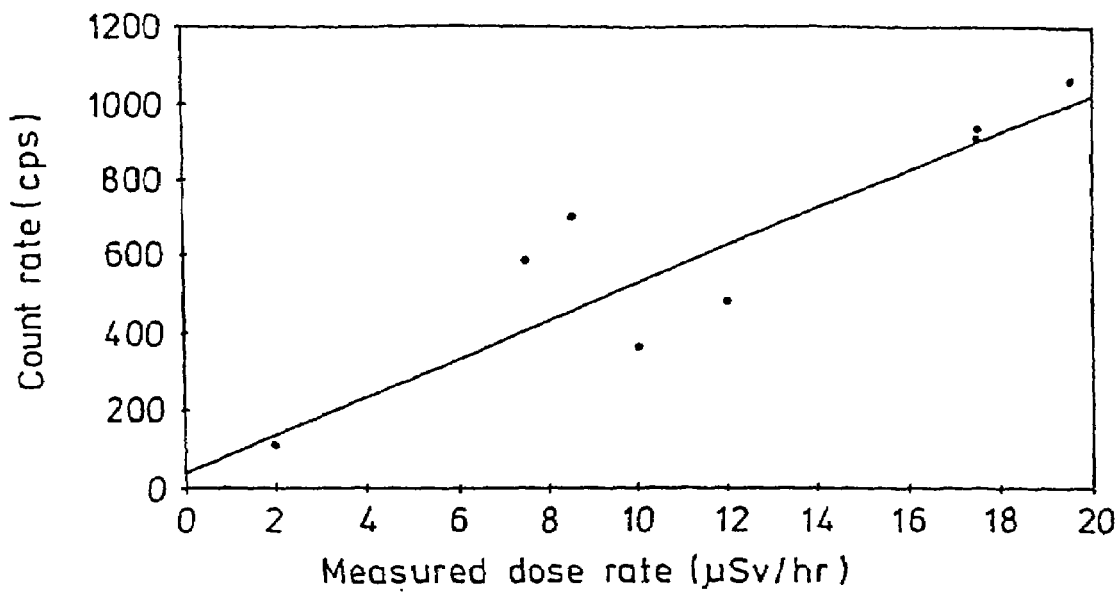
Figure 19:
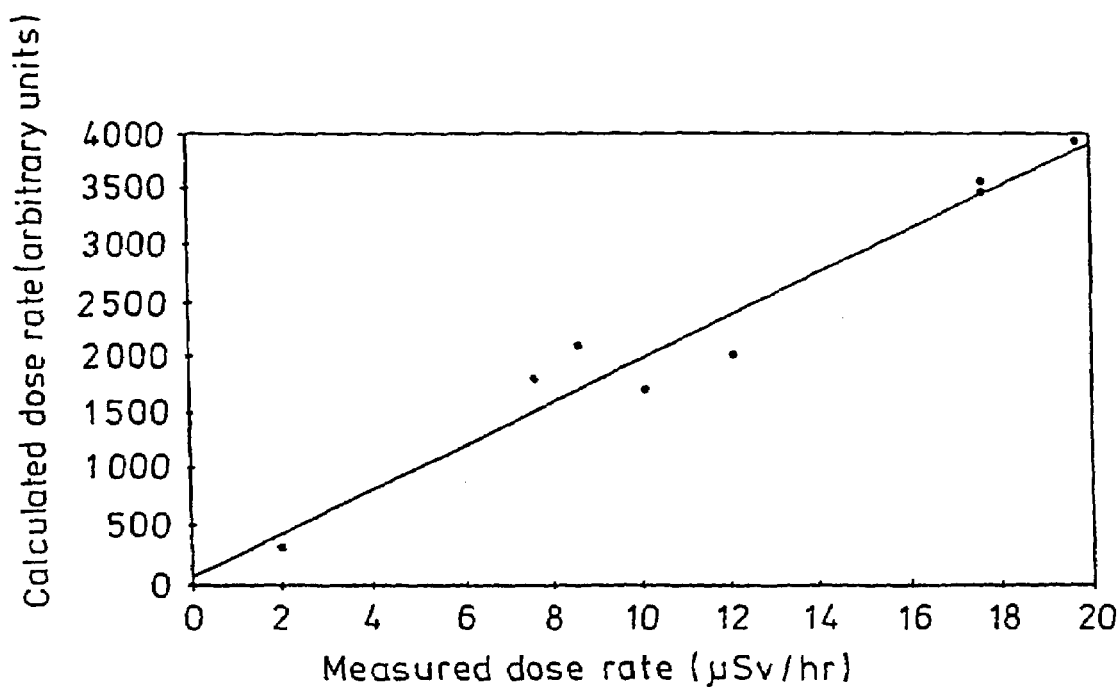
Figure 20:
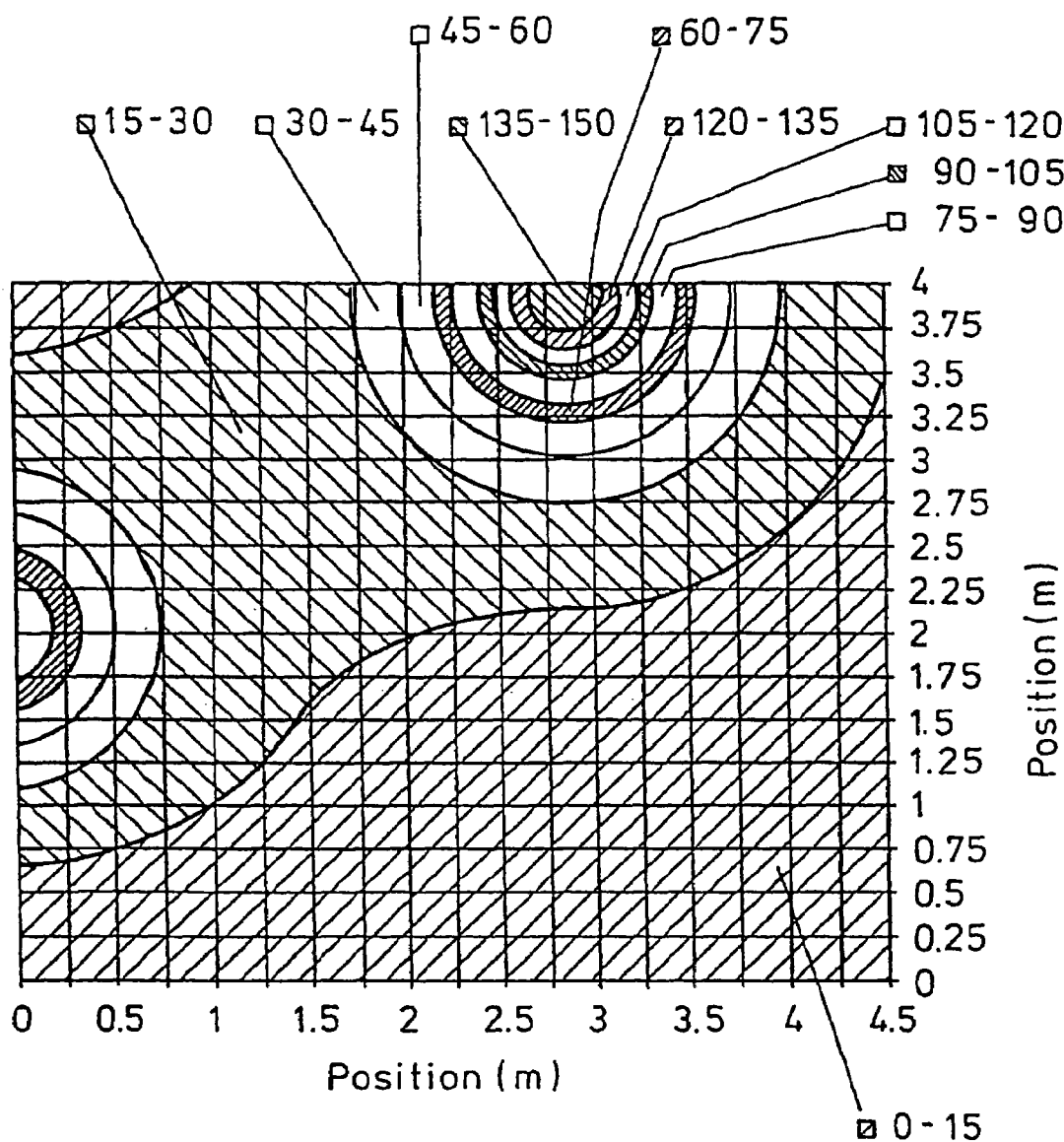

FIG. 17 compares the dose values obtained from the present technique with a prior art instrument placed at the location of interest;

FIG. 18 provides the comparison of FIG. 16 for a total count rate against dose rate observation;

FIG. 19 shows the comparison of FIG. 16 based on a measured spectrum being taken as equivalent to the emitted spectra; and FIG. 20 illustrates a dose rate contour plot for an environment analysed according to the present invention.

DETAILED DESCRIPTION OF THE PREFERRED EMBODIMENTS

Figure 1:
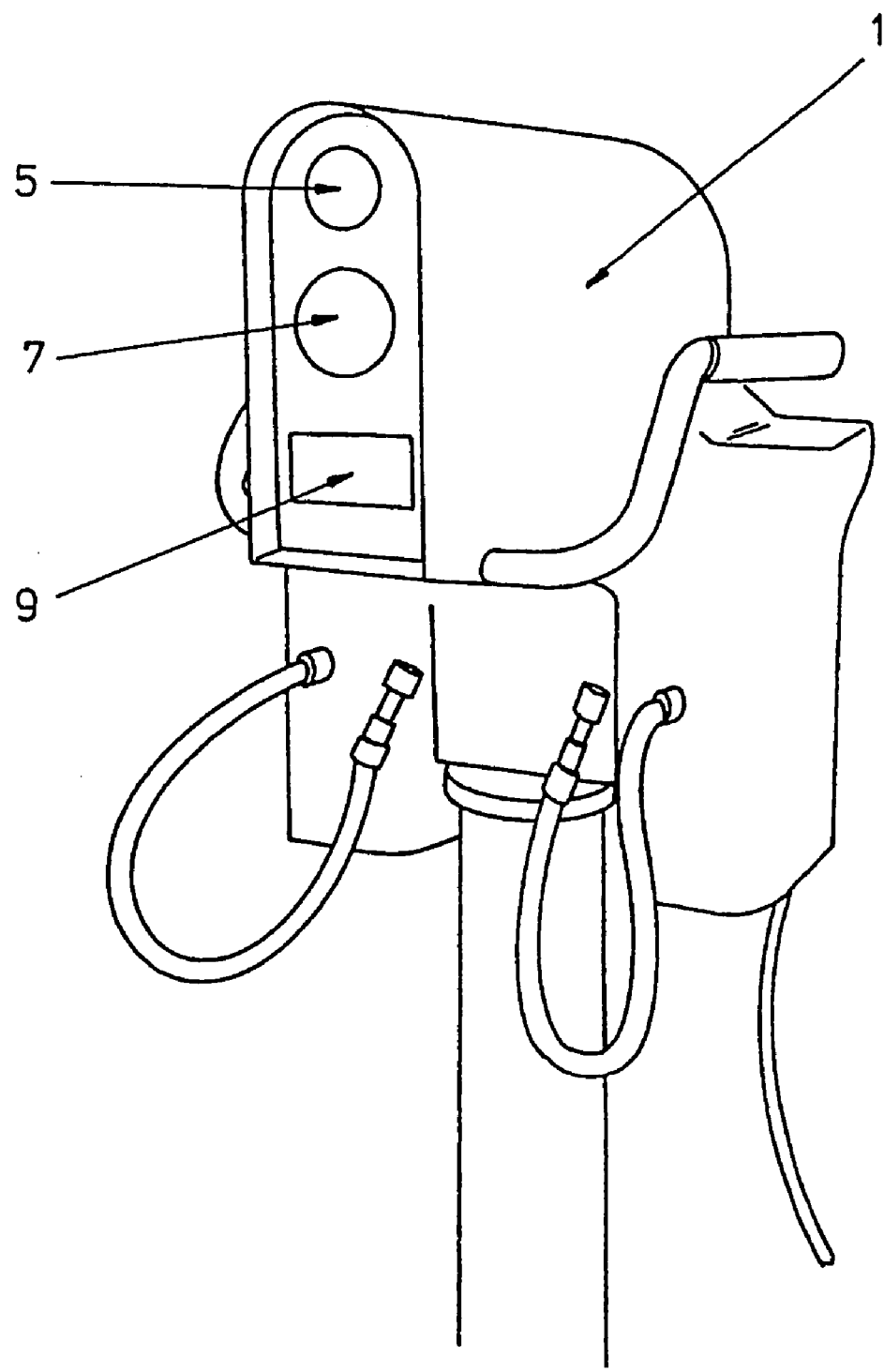
FIG. 1 illustrates a radiometric measuring array suitable for the present invention.

As an initial point it is necessary to obtain radiometric measurements relating to the environment under consideration. These are possible using a count rate detection assembly. Such apparatus includes an inspection head 1 of the type illustrated schematically in FIG. 1. The inspection head 1 is connected to a remote operator console, not shown. The head 1 is capable of pan and tilt movement controlled from the console by the operator or automatically according to a predetermined program. The head 1 includes a gamma detector 5, in this case a tungsten collimated caesium iodide scintillator, a video camera 7 and a laser range finder 9. The tungsten collimator containing the detector has an aperture with a plain angle width of 4°, but additional, exchangeable, collimators with widths 9° and 2° are also provided. The operator console includes a computer to process data, a video display unit, VDU, and video cassette recorder, VCR. The VDU displays the video image from the camera on the head 1 and a circle is superimposed upon this to indicate the field of view of the collimated scintillator. The console also receives information concerning the pan and tilt angles of the head and the range to the object in the centre of the field of view determined by the laser range finder 9.

The VCR is used to record the contents of the VDU screen and allows recall of the video data at a later date or the replay of previous scans through the console.

The scanning operation of the head can be controlled manually through the console, but automatic scanning is preferred for generating the data inputs for the present invention. A rectilinear raster scan across the area from top left to bottom right is preferred with varying dwell time and pitch according to the operating parameters of the invention.

In a preferred scanning regime the number of locations analyzed decreases for a given tilt angle, as the tilt angle increases, according to the cosine of the tilt angle to the equatorial plane.

During operation the instrument outputs data to an output file which includes the pan and tilt angles of the head, the range finder distance and count rates of different energy bands originating in the region of interest. A sample of such information is disclosed in FIG. 2, a larger number of energy bands are likely to be monitored in practice to cover the full energy range of the spectra. A multichannel analyser, for instance MAESTRO available from EG&G Ortec, may be used to receive the values for the various ranges.

The monitoring apparatus thus provides a measure of the count rate and the energy deposited by each interacting photon at the detector. The contribution from gamma radiation along a narrow angle of incidence only is determined, contrary to the majority of prior art health physics instruments which are sensitive to radiation from all directions.

The present invention enables count rate and energy data to be successfully used to determine a dose map, based on dose, or dose rate to be determined for a given point, without direct monitoring at that point for the first time. The system employs processing of the data obtained from the apparatus with a view to determining the effects of a detector and its collimator which give rise to the measured spectrum, so as to produce an emitted spectrum for each point in the environment. Additionally, the system incorporates the emitted spectra into a computer model of the environment and from this model a map of the resulting dose can be calculated or the dose rate at a given point predicted. The dose rate is based on the combined effect of the gamma spectrum emitted from each point in the environment on the point of interest.

To obtain the required result the environment in question should be accurately scanned in a regimented manner. The automated scanning regime preferred for the present invention is one of rasta scanning with a series of points, which may include an area about them, being measured to cover the area. A trade off between the frequency of the points and the time taken for the scan is to be made. The more frequent the points are measured, and hence the lower the gap between points, then the more thoroughly the environment will be measured. A degree of overlap by selecting a suitably small pitch selection gives maximum accuracy as full analysis is provided. An increased measurement time arises as a result, however. In the alternative scenario too large a pitch and the resulting gaps between measurement areas, can cause inadequate measurement of the environment.

To obtain an accurate determination measurements must be made over the whole, or at least the significant, part of the spectrum which is contributing to the dose. A range of 30 keV to 2000 keV is sufficient for most applications, but a reduced range of 150 keV to 1500 keV can be tolerated in certain circumstances.

Figure 3:
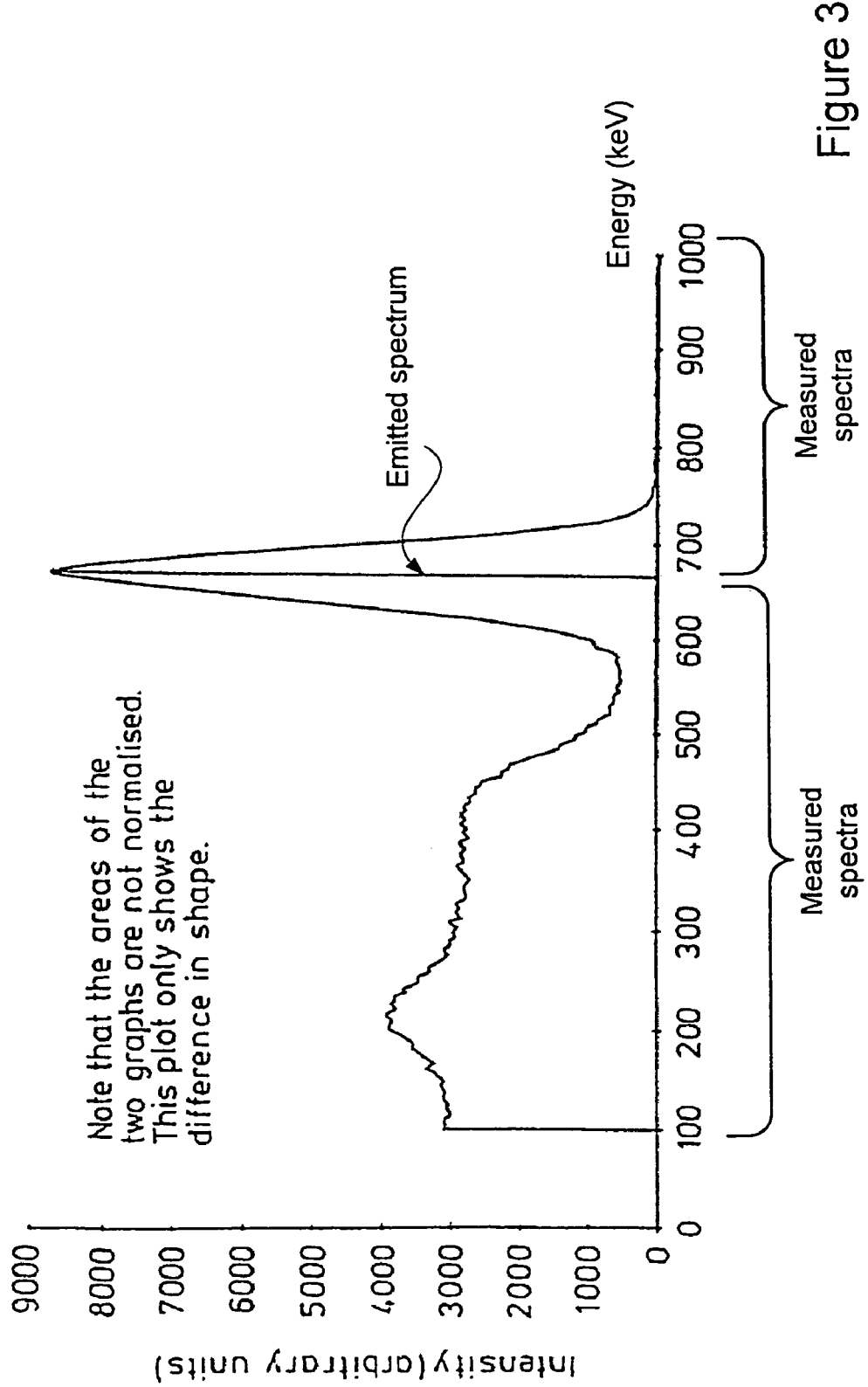
FIG. 3 illustrates the difference between a measured spectra and emitted spectra across a range of energy values.

Having obtained the measured spectra it is imperative to calculate the actual emitted gamma spectra for the environment across the whole spectra. The measured/recorded spectra can differ substantially from the emitted/incident spectra. The variation in the difference between the two is illustrated in FIG. 3. Dose rate assessments based on assuming measured spectra equate to emitted spectra will lead to substantial dose rates underestimates which may not be tolerable. The extent of underestimation increases as the emitted gamma ray energy increases.

The production of emitted gamma spectra from measured spectra can be based on a modified version of a technique designated, spectrum stripping.

The basic technique considers the response functions of the instrument in question, determined either from calibration source measurements or calculation, against the spectra. The measured spectrum obtained in practice is unpeeled by starting with the highest energy level part of the spectra. A response function is derived for the said energy level of the bin function. The response function to this is multiplied by a variable factor and subtracted from the recorded spectrum to reduce the upper end of the spectrum to zero. The contribution from that energy source type is evaluated based on this variable factor compared with other variable factors for other parts of the spectra. The technique then progress to next lower energy anticipated which is then selected and stripped from the spectrum in a similar process. By repeating the process over and over the entire recorded spectrum is reduced to zero and accounted for in terms of a variety of energy level contributions. The multiplication factor by which each response function was multiplied to equate to the measured spectrum gives the relative intensity of that component.

Unfortunately in real world environments, such as those found on nuclear plants, the energies contributing to a spectrum are not formed of a series of mono-energetic sources. Energy components from scattered and penetrating radiation also contribute to the spectrum.

Figure 4:
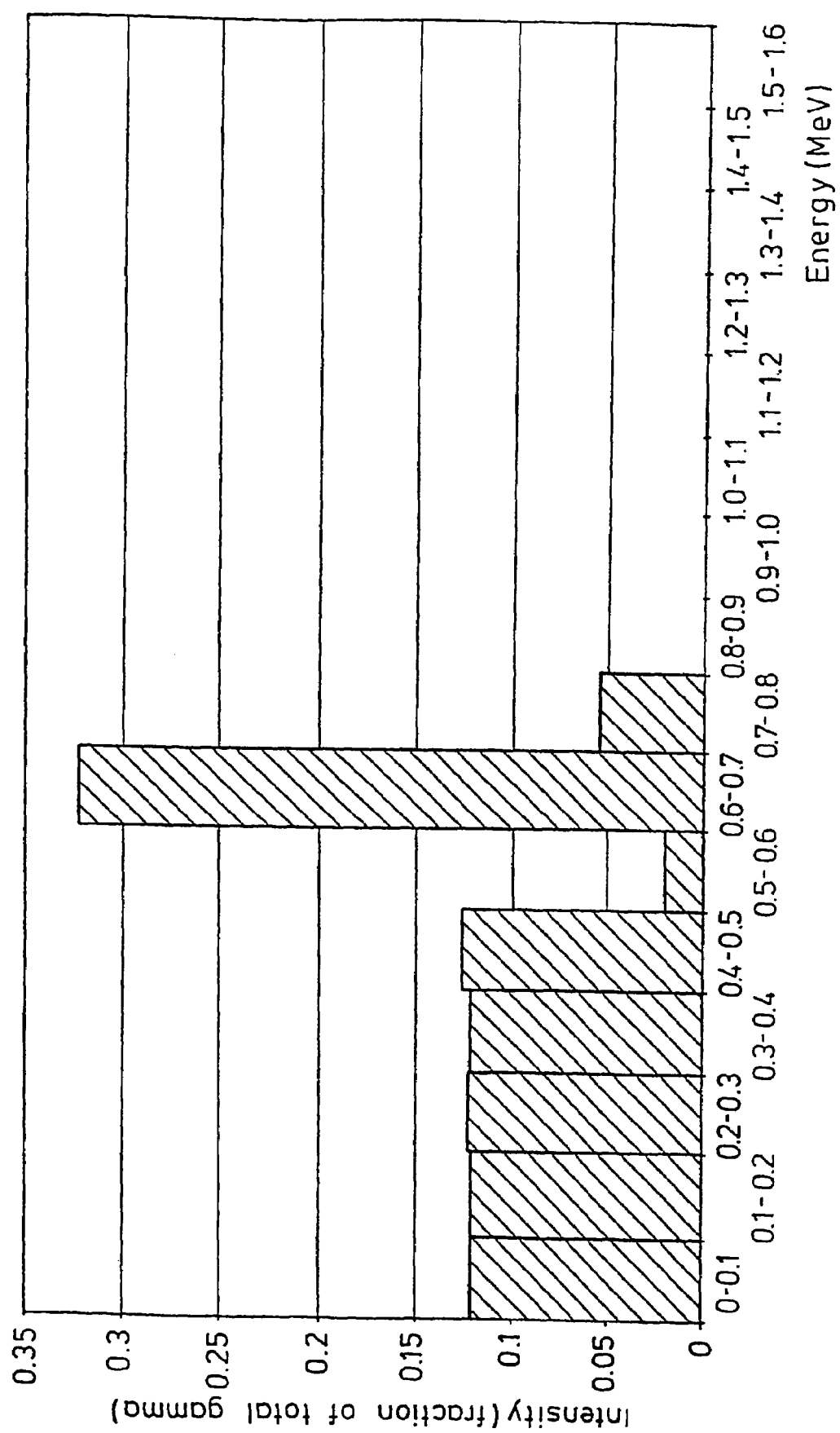
FIG. 4 illustrates a bin spectra for Cs-137.

To account for such non-mono-energetic spectra components a generic spectrum stripping algorithm was developed. In analysing a radiation field the spectra are grouped into bins of a predetermined energy width, generally 100 keV. For a 30 keV to 2000 keV spectrum, 15 discrete energy bands are normally sufficient. Such a binned spectrum is shown in FIG. 4 for Cs-137.

Each bin spectrum is then subjected to a spectrum stripping technique of the type described above so as to work down in energy until all of the energy bins have been stripped. The result of this is a series of factors corresponding to the incident gamma flux.

The technique treats each bin as a source whose energy is the mean energy of that bin. Thus the mixed field distribution occurring in practice is approximated to a number of discrete, uniformly spaced, energies of intensity corresponding to the mean, and hence known. The end result is that if a spectrum can be recorded and stripped in this manner for each measurement point of a scan then at any point the dose rates for dose maps can be determined.

In an alternative technique an emitted spectrum can be obtained from a measured spectrum based on an iterative process.

The process relies on response functions of the type discussed above, with the emitted spectrum being considered as the summation of the response functions multiplied by variable factors. A calculated version of these variable factors can be determined from the measured spectrum by repeated comparison.

The measured spectrum is binned in the manner described above and the mid point energy level response function for each bin is determined from pre-stored data.

Figure 5:
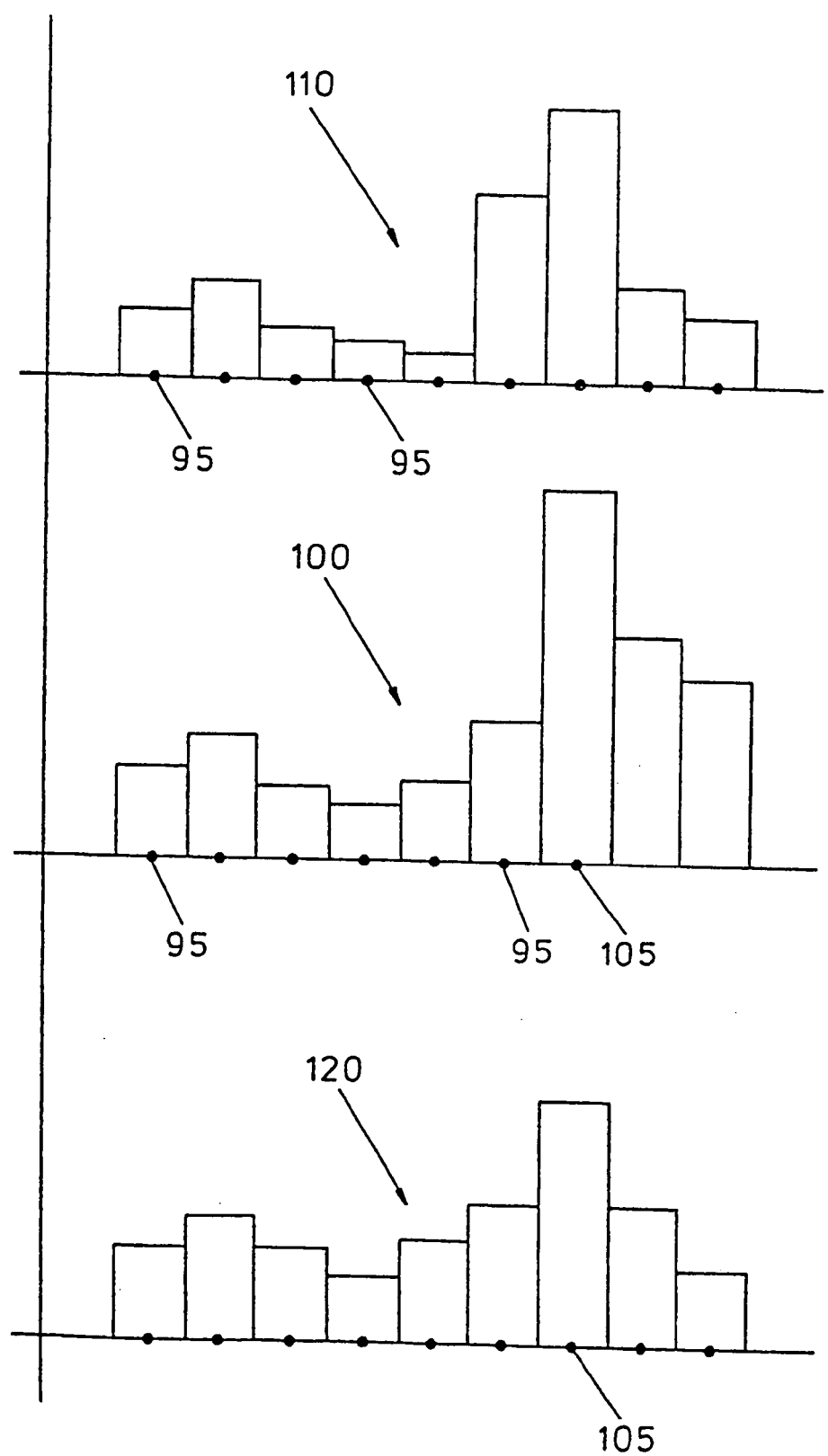
FIG. 5 illustrates a comparison between a measured spectrum, a generated spectrum and an iteratively modified generated spectrum.

A comparative spectrum is generated, based on each response function 95 being multiplied by a variable factors, each variable factor being set at an initial level. As seen in FIG. 5 the sum arising 100 is compared with the corresponding measured spectrum 110.

One or more of the variable factors can then be altered and the process repeated. In this example the variable for response function 105 is reduced to bring that point of the spectrum close to the measured spectrum 110.

A comparison, such as chi-squared goodness of fit, can be made between the initial 100 and subsequent response 120 to measured 110 fit. The relative result is used to determine the subsequent adjustments until a threshold accuracy/fit value is crossed at which put the process is stopped.

The level of the factors of each of the response factors determined in the results gives the emitted spectrum.

The stripping of a spectra as discussed above, is either method is reliant on a response function for each of the energy bins presented in the measured spectra. As previously stated mono-energetic gamma ray sources are not present in practice and these are normally employed to determined the response functions. Experimental measurement of these values is therefore not possible. To account for this in the present invention, therefore, Monte Carlo modelling was used to evaluate the required response functions.

This modelling process required a model of the apparatus used in the method to be incorporated in software such as MONTE CARLO NEUTRONS AND PHOTONS™ (available from Los Alamos National Laboratories). The model determines the response of the caesium iodide scintillator to incident gamma rays of determined, varying energies across the spectra of interest. The response function was determined using this model for the mean value of each 100 keV energy bin across a spectrum from 50 to 1450 keV in 100 keV steps.

Figure 6:
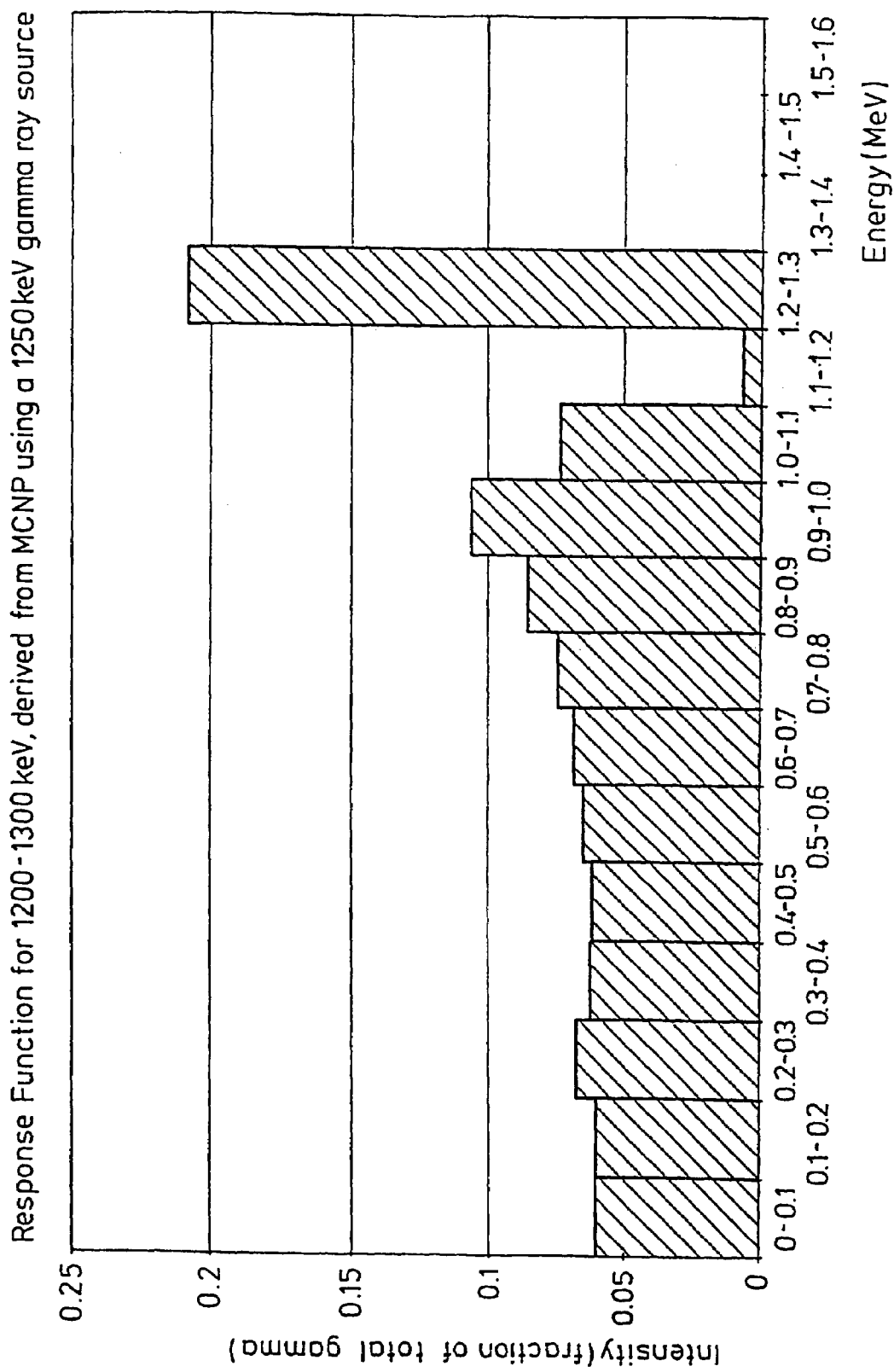
FIG. 6 illustrates a response function for 1200–1300 keV using 1250 keV gamma ray source modelled on MCNP.
Figure 7:
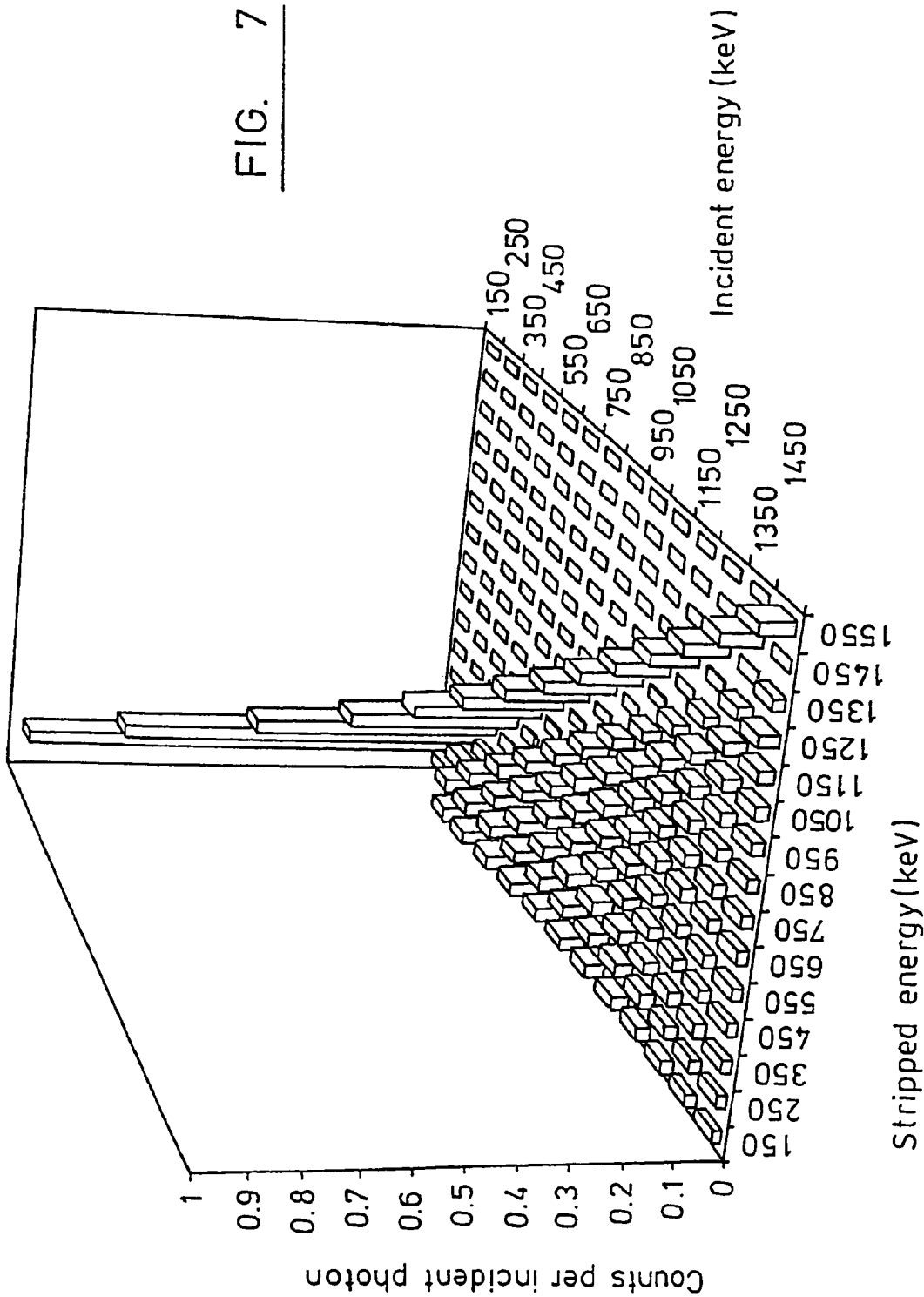
FIG. 7 shows a complete set of response functions obtained from the MCNP model.

The modelling solution employed a parallel beam of incident gamma rays to approximate for a point source at a typical range. A set of response functions for 1200–1300 keV using a 1250 keV source is shown in FIG. 6, with a complete set of response functions obtained in this manner provided in FIG. 7. Based on the modelled response functions the experimentally measured spectra can be converted into an accurate version of the emitted spectra.

The overall information resulting, from either process, therefore, provides data at any given measurement point as to the actual emitted spectra and the location of that spectra source, in space, within the environment, due to the range value and the tilt and pan values from the instrument head assembly.

This information can form the input data to a processing system designed to arrive at the dose or dose rate results.

Within the environment the range, tilt and pan data is converted to x, y, z coordinates representative of the location and to which the data relating to the various bands forming the spectra are allocated. Each point can be considered as a separate source whose emitted spectra is known, although it is possible to consider each set of measurements as an area with the emitted spectra of desire.

Figure 8:
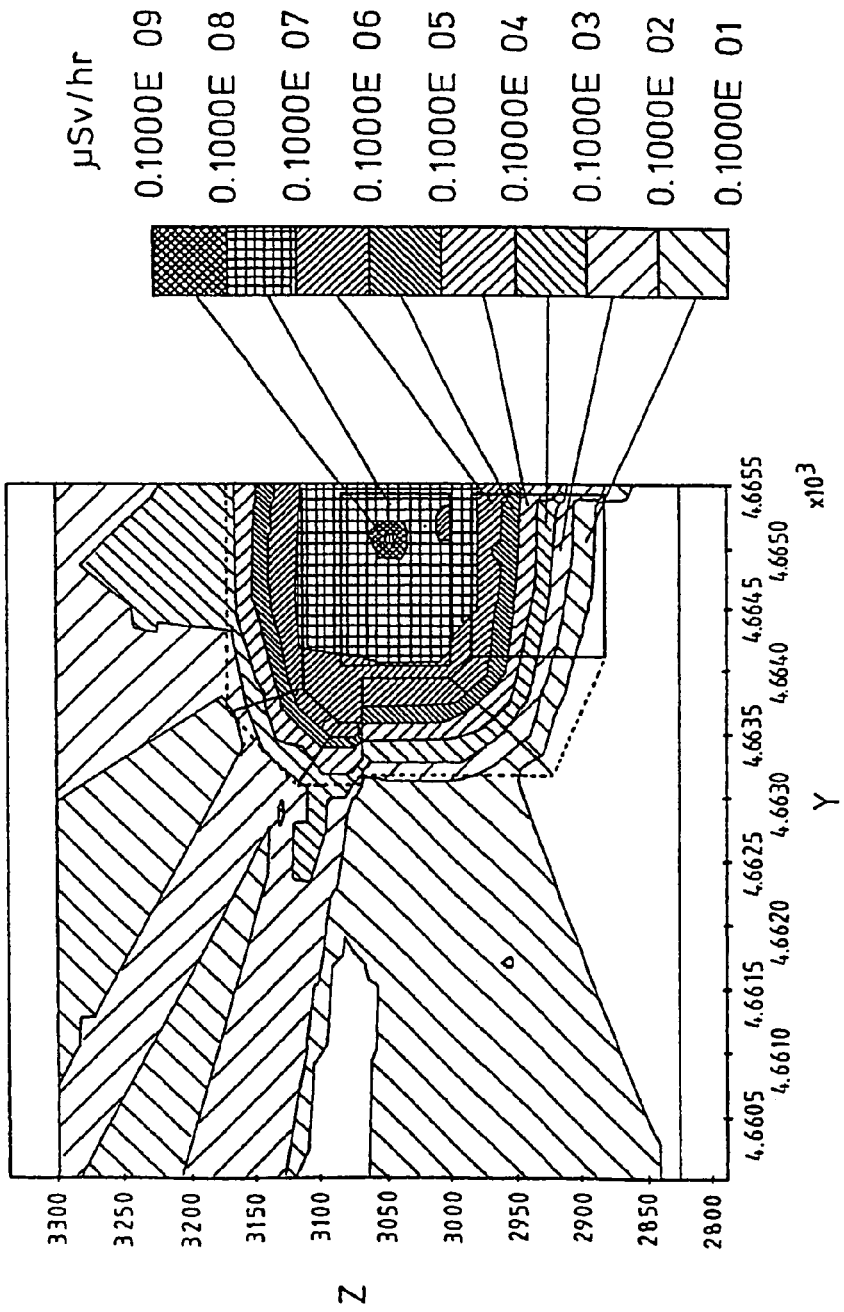
FIG. 8 illustrates a 2D slice through an environment indicating dose contour plots present invention.

The dose or dose rate information can be determined by a variety of modelling techniques. A modelling software package such as DECOM the use of which is available from British Nuclear Fuels plc can be used, for instance. The model provides a representation of the surface shapes within the modelled environment and also takes into account the shielding, scattering and other effects arising from their presence. A typical result obtained using DECOM is illustrated in FIG. 8. The result is a 2D slice through the environment indicating dose for the various locations in that plane based on the environment under consideration.

The input data supplied to DECOM above can alternatively be used in MONTE CARLO NEUTRONS AND PHOTONS™ modelling software to produce dose rate from the various source distributions. A similar input file providing locations and strengths of sources and a description of the environment in which they are located enables MCNP to calculate, on a photon by photon basis, the progress of photons through the model from birth to death. Once a sufficiently large number of photons have been modelled for the environment the user can select certain volumes within the modelling environment on which dose rates can be calculated.

Such a dose mapping technique is, however, not the most suitable for environments involving heavy shielding. Unfortunately the dose rate behind such shielding requires a very large number of photons to be modelled, the vast majority of which will never pass through the shielding and contribute to the dose at the area of interest. The computing time necessary to evaluate the passage of these non contributing photons is, however, still required.

A third alternative dose mapping technique is offered by use of a commercially available spread sheet package, such as EXCEL from Microsoft or even specifically written code. By assuming that the measure sources are each point sources then the locations of those sources can readily be presented in a spread sheet. The use of flux to dose conversion factors can then be employed to determine the dose rate at any point; the dose at any point being the sum of the doses from each source within the environment.

Such techniques are, however, less versatile and weaker as no estimation can readily be made for scattering or absorption within the environment. Distance is taken as the predominant factor in determining dose rate.

The evaluation of the technique, through theoretical data and actual experimental verification is now illustrated.

Figure 9:
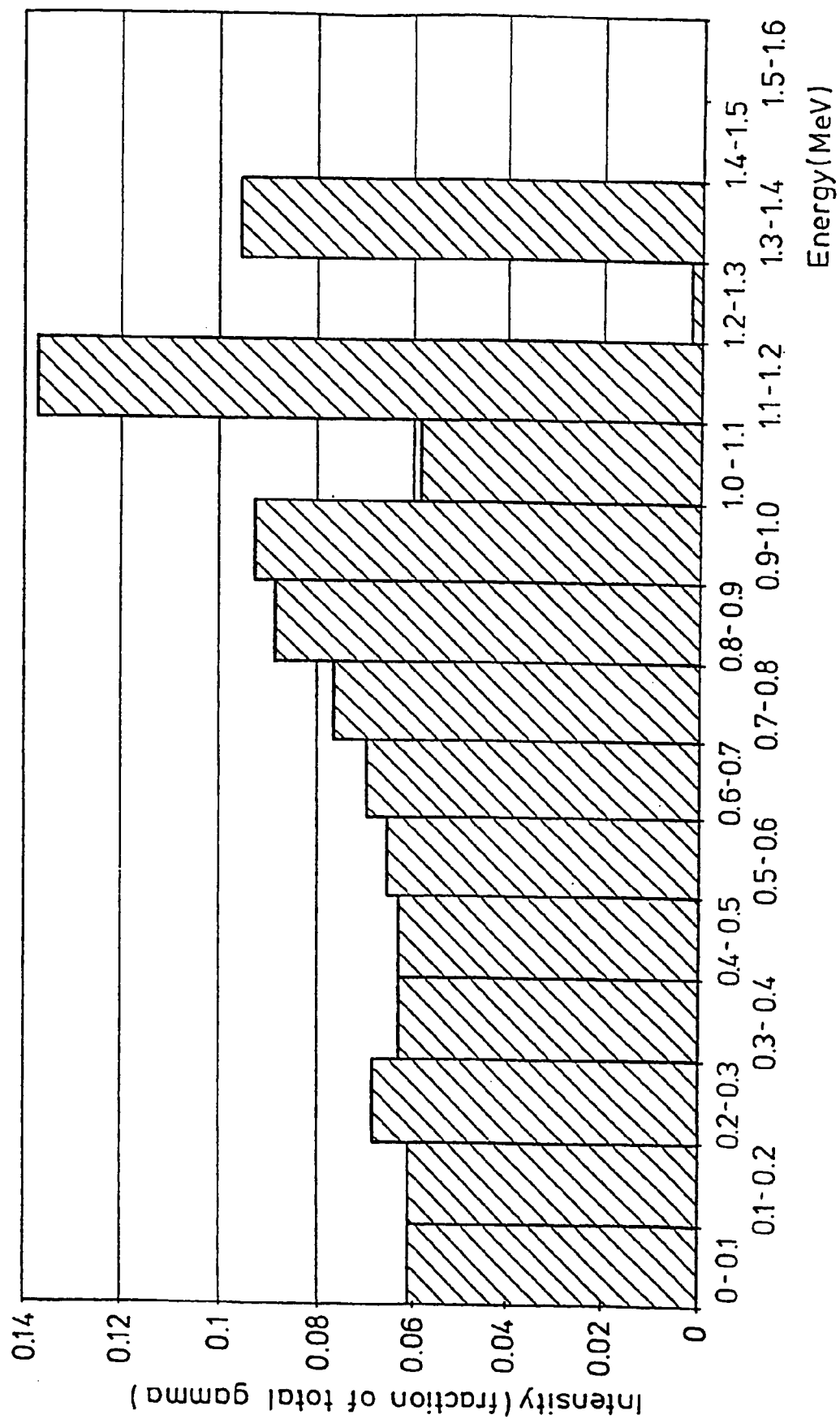
FIG. 9 illustrates an MCNP generated, binned spectrum for Co-60.
Figure 10:
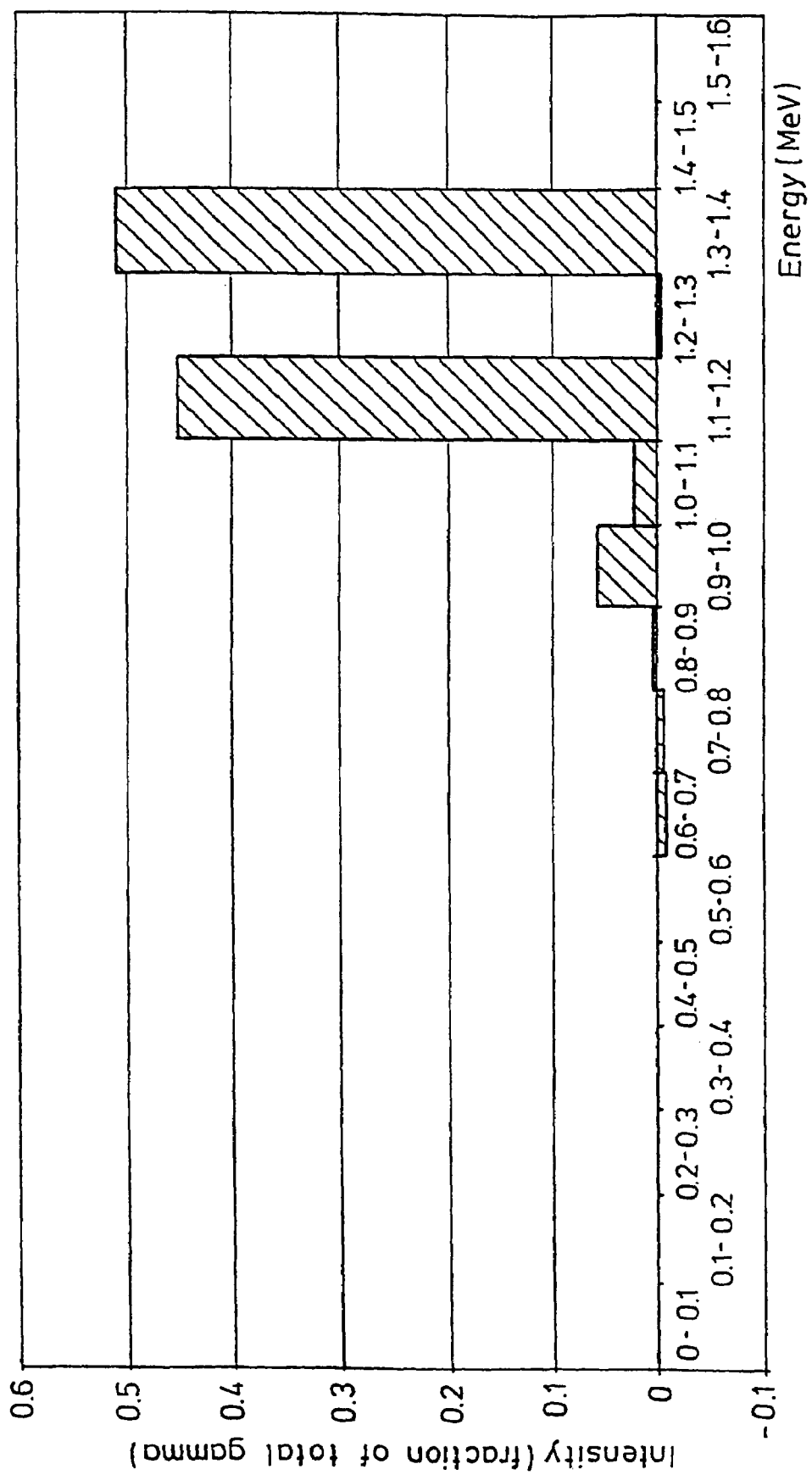
FIG. 10 illustrates an emitted spectra calculated from the determined spectra of FIG. 8.

MONTE CARLO NEUTRONS AND PHOTONS™ modelling software was used to provide simulate real input results from a detector to give data for consideration. The model provided input data based around an incident spectrum consisting of 50% each of 1173 and 1332 keV gamma radiation, typical of cobalt 60. The simulation produced a spectra for a variety of gamma rays extending beyond those specific energies to simulate scattering and other effects present in real systems. The spectra was then binned in the manner discussed above, and is illustrated in FIG. 9. This spectrum was then stripped, using the response functions previously calculated, on an EXCEL spread sheet. The incorporated stripping algorithms produced the emitted spectra which is illustrated in FIG. 10.

Figure 11:
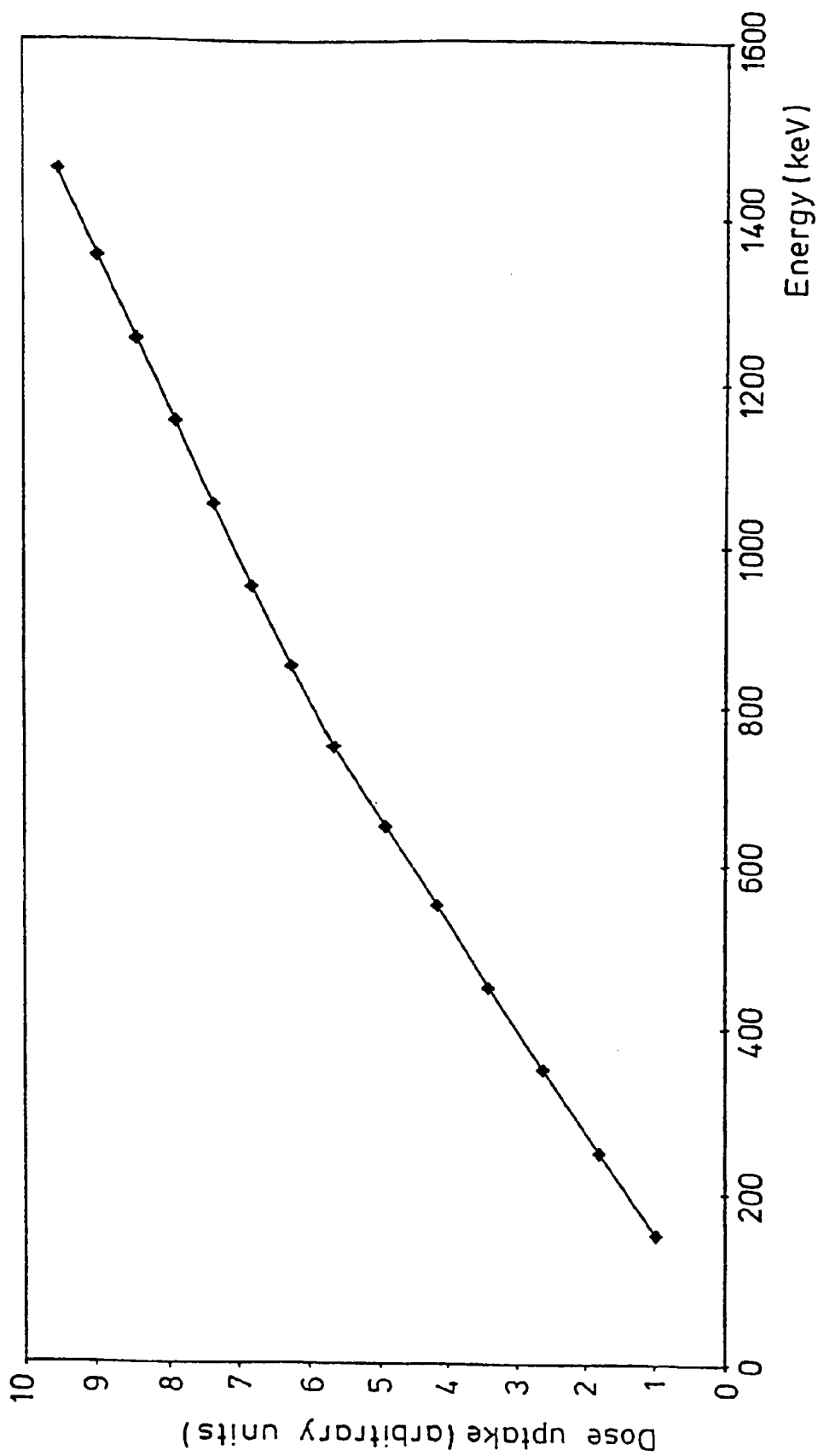
FIG. 11 illustrates the variation of dose uptake across gamma ray energy spectra.

The effect of a gamma ray of a given energy on dose varies significantly with energy. FIG. 11 illustrates the variation of dose uptake across the relevant gamma ray energy spectra. Using the data from this table and the calculated emitted spectra of FIG. 10 an end result can be obtained for that source. With the total dose from that source calculated as a summation of the partial doses arising from each of the energy bins in the full spectra.

The determined dose from the created experimental scenario was calculated to be 8.35 units compared with the true dose rate, which could be calculated as the incident spectrum was known, of 8.33 units. A high degree of accuracy to within 1% is thus established.

In a similar manner modelled measured spectra arising from Cs-137 and Cs-134 were also determined, together with an analysis based on a mixed Cs-137 and Co-60 contribution in a 10 to 1 ratio. The stripped dose values/true dose values for these determinations are as follows.

| Isotope | Stripped Over True Dose |
| --- | --- |
| Co-60 | 1.002 |
| Cs-137 | 0.992 |
| Cs-134 | 1.068 |
| Cs137:Co60 (10:1 ratio) | 1.001 |

The lower level of accuracy with the Cs-134 measurements arise from the greater deviation between the actual emitted energies (605 and 796 keV) and the mean energies on which the modelled response functions were calculated (650 and 750 keV) than for the other isotopes considered. The selection of bin ranges to present mean values close to the emitted spectra values for the anticipated source types could be envisaged to minimise such errors.

The actual accuracy of the technique can be demonstrated still further if the finite energy resolution of the scintillator used to detect the incident gamma rays is taken into account in generating the modelling input data. The modelling technique used to arrive at radiometric data of the gamma ray interactions is a delta function. However, spectra actually collected experimentally have peaks which are broadened by statistical effects in light collection. In a similar vein the modelled Compton edges used in the calculations are not broadened as they are in practice.

The effect of peak broadening which occurs in practice can be introduced into the modelling data generated by MCNP by convoluting a normalised gaussian distribution with the model data. The gaussian function employed is given by $$P(E) = A \exp{-(E-E_0)^2/2\sigma^2}$$

where P(E) is the value of the gaussian at energy E;

A being a normalised constant;

$E^0$ the peak energy; and

σ is 1/2.35 times the full width of the half maximum which was determined to empirically vary as $(4.6E_0)^{1/2}$.

Figure 12:
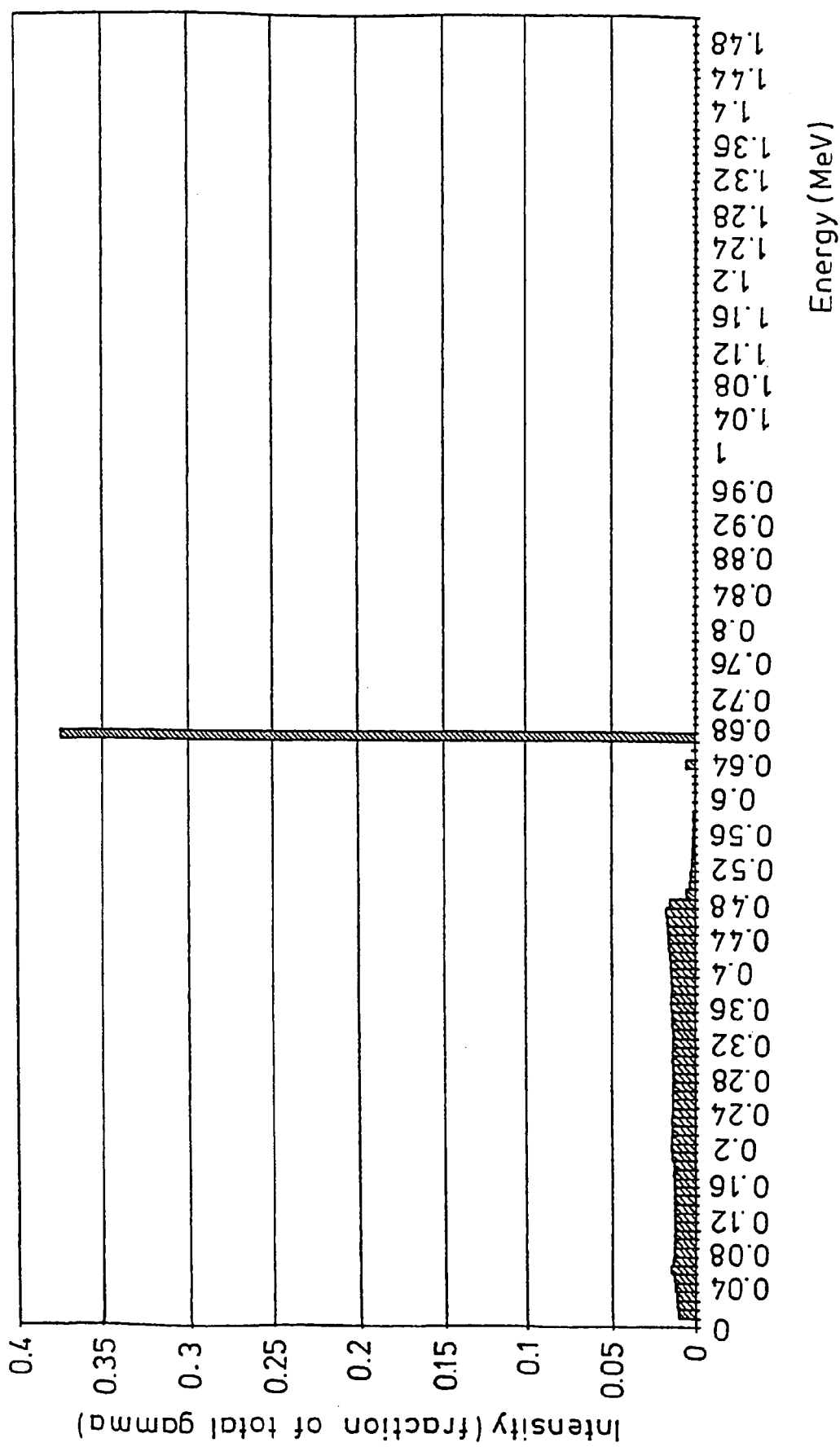
FIG. 12 illustrates a Cs-137 gamma spectra generated by model MCNP.
Figure 13:
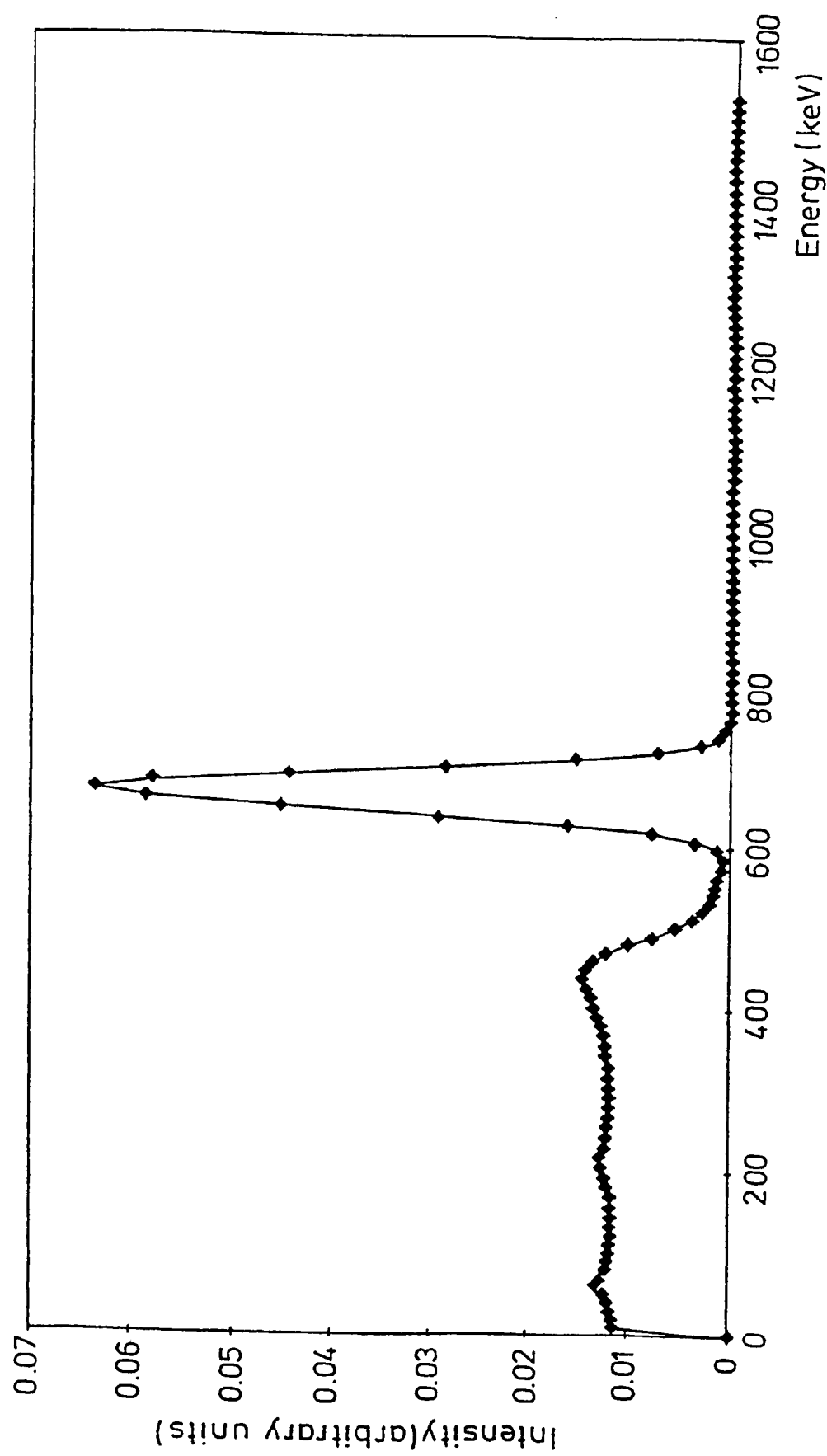
FIG. 13 illustrates a broadened spectrum produced from the spectrum of FIG. 11.

The convolution of the gaussian with the data produced by MCNP is possible using the worksheet and an unbroadened spectrum produced from the MCNP model, illustrated in FIG. 12 for Cs-137 converts to FIG. 13 when the gaussian shape is convoluted with it.

The effect of peak broadening is to move some of the events from the bin they should lie in to a neighbouring bin. Thus for Cs-137 not all photo peak events lie in the 600–700 keV energy bin. Those events moved up and those events moved down in energy as a result of the peak broadening to an extent offset one another. This in combination with the linear nature of the energy against dose shown in FIG. 11 maintains the accuracy of the dose calculation.

Where convolution to give the peak broadening effect is incorporated spectrum stripping can still be carried out using the same unbroadened response functions determined previously. A similar effect occurs with the Compton events which also undergo peak broadening. Once again events relocated to a higher bin are back cancelled to a large extent by those relocated to lower bins.

Analysis of the accuracy of dose calculation for the model solutions with and without peak broadening effects being taken into account produces the following results.

| Isotope | With Broadening | Without Broadening |
| --- | --- | --- |
| Co-60 | 1.007 | 1.002 |
| Cs-137 | 1.021 | 0.992 |
| Cs-134 | 1.019 | 1.068 |
| Cs137:Co60(10: ratio) | 1.007 | 1.001 |

The accounting for peak broadening significantly improves the accuracy where the emitted gamma ray peaks are close to the borders of energy bins, for instance Cs-134.

As previously stated the lack of mono-energetic sources in real world environments precludes the experimental determination of response functions for the energy bins. As a consequence it is necessary to rely on response functions obtained from modelled data, but clearly their use must be justified to ensure accuracy. The justification is determined by assessing the ability of the MCNP model to accurately model the detection system used in practice.

To make this comparison the spectrum from a Cs-137 source was monitored using the detection instrument in a real-world experiment. The count rate and energy results determined by the instrument were then binned into 100 keV energy bins, which results are presented as FIG. 14. This spectra is an experimentally determined equivalent to the model determined spectra of FIG. 15.

Figure 14:
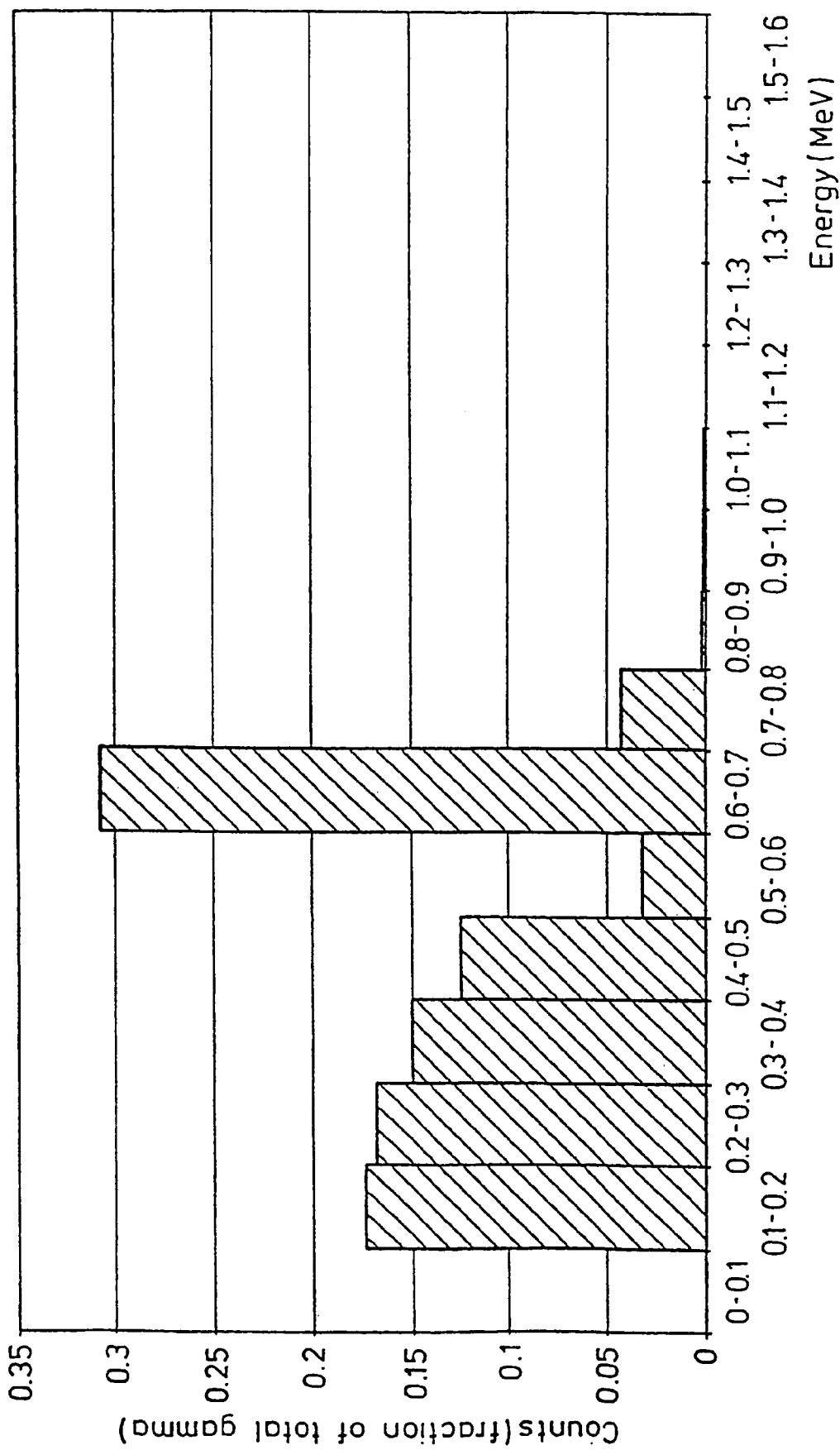
FIG. 14 illustrates a binned gamma spectrum for a Cs-137 source experimentally determined.
Figure 15:
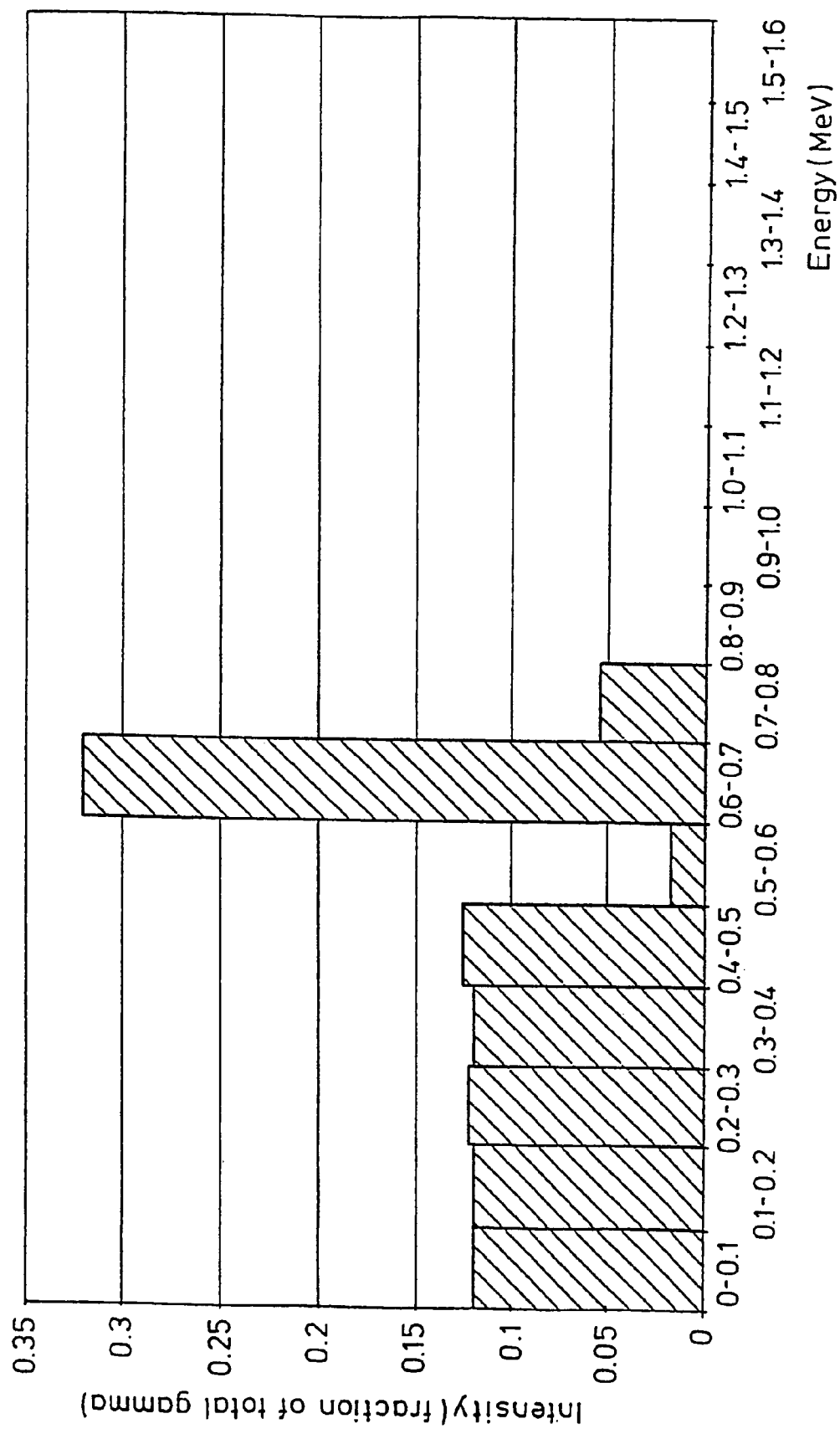
FIG. 15 illustrates a model determined Cs-137 spectra.

The spectra illustrated in FIG. 14 obtained experimentally was then unpeeled using the stripping technique described previously to produce the emitted spectra shown in FIG. 16. The unpeeling worked to a significant degree, placing 87% of the count measured in the 600–700 and 700–800 keV bins. The source in question produced 662 keV photons in practice, which as a result of the gaussian peak broadening previously discussed, expanded into the neighbouring energy bin also.

A calculated dose based on these results yielded a dose which is 96% of that obtained if all the counts were placed at 662 keV.

In any event it is unreasonable to assume that all of the gamma rays emitted by even a commercially prepared Cs-137 reference source are of 662.6 keV and that the deviation arose as inaccuracies in the technique. Such a source is inevitably not pure, other components besides caesium being present and is additionally sealed in a steel can. The steel and impurities can each give rise to scattering of the 662 keV radiation emitted by Cs-137 giving spread below the 662.6 keV point even for a true emitted spectra.

To evaluate the extent of this likely spread MCNP was used to model the likely spectra from the Cs-137 source obtained from Amersham International (reference code X7 CS-137) and used above. The source in question is 3 mm long and 3 mm in diameter encapsulated essentially in steel of overall size 6 mm long and 4.5 mm in diameter. The calculated emitted spectra using the MCNP indicates that only 93% of all photons that penetrate the encapsulation of the model source escape with their full energy. The remainder are scattered below this 662.6 keV value.

Based on this revised actual emitted spectrum source compared with the experimentally determined values, an agreement to greater than 1% accuracy between the two is obtained.

The results according to the technique of the present invention were compared with a standard health physicians dose probe in the following manner. The Cs-137 (7.8 mCi; dose rate at 2 m, 7.5 micro sv/hr), Cs-134 (0.87 mCi; dose rate at 2 m, 2.0 micro sv/hr) and Co-60 (2.6 mCi; dose rate at 2 m, 10 micro sv/hr) sources were placed 2 m from the detector in all possible combinations of the three sources. The traditional instrument was used to make dose measurements at the detector for the instrument of the present invention.

Spectra were collected for 200 seconds in each of the scenarios relating to various ranges of dose rates and gamma fields. These results were analyzed to produce a value proportional to the dose rate according to the present invention. The results from the present invention are compared with those of the prior art dose meter in FIG. 17 and good linearity is seen to exist.

Such linearity did not occur with the total count rate observed by the instrument against dose rate or with the dose rate calculated from an unstripped bin spectrum against the measured dose rate, see FIGS. 18 and 19.

The above tests were also reproduced for the Co-60 source and a Co-60 and Cs-137 source in combination for a collection time of 10 seconds to reflect the speed at which measurements are required in practice. These results are indicated below and show good correspondence between the two indicating that accurate measurements can be taken in short time scales.

| Source | Dose Rate 10 seconds | Dose Rate 200 seconds | Difference % |
|---|---|---|---|
| Co-60 | 6430 | 6320 | +1.7 |
| Co60 & Cs137 | 10570 | 10830 | −2.4 |

The method and apparatus provided by the present invention therefore allow dose rates to be determined in mixed gamma fields on a practicable time scale with great accuracy for any location required, based on detection from a remote point.

A further example of the successful use of the present invention is illustrated in FIG. 20 and the table below.

An instrument according to the invention was used to produce a dose map of a laboratory with two sealed sources provided in it. The environment contained a 10 mCi and a 7.8 mCi Cs-137 source and was scanned automatically using the instrument. The output file from the scan was used to produce a dose plot in the manner described above.

FIG. 20 illustrates the dose rates calculated on a horizontal plane located 1 meter above ground level for the laboratory. The two sources were located at 1.5 meters above ground, the 10 mCi source at coordinates 2.75, 4 meters and the 7.8 mCi source at 0, 2.0 meters. The locations of these sources can readily be identified on FIG. 20 by reference to the areas of highest dose rate.

To check the instruments performance a conventional dose probe was also used to measure the same environment and sources. The results for the comparison, at a plane height of 1 meter, are presented in Table 1.

TABLE 1

| Location | Instrument measured dose | Probe measured dose |
|---|---|---|
| 0.5, 2 m | 43.0 μSv/hr | 44.1 μSv/hr |
| 0.5, 1 m | 19.6 μSv/hr | 19.1 μSv/hr |
| 1.5, 2 m | 16.9 μSv/hr | 16.6 μSv/hr |
| 1.5, 1 m | 12.2 μSv/hr | 10.9 μSv/hr |
| 1.5, 0 m | 7.6 μSv/hr | 6.3 μSv/hr |
| 2.5, 3 m | 33.5 μSv/hr | 37.5 μSv/hr |

As can be seen the instrument provides an efficient and accurate measurement of dose rates in the environment and is applicable to a greater range of environments than the conventional dose prove can be introduced into.

The invention claimed is:

1. A method for determining dose or dose rate for one or more selected locations within an environment, comprising the steps of:
    a) measuring incident gamma ray energy and count rate from one or more sources, for one or more viewed portions of the environment, at one or more measured locations within the environment to obtain one or more measured spectra for said measured locations;
    b) measuring the spatial position of each of said measured locations;
    c) determining an emitted spectrum for each said viewed portion of the environment from said measured spectrum for each said viewed portion of the environment;
    d) inputting the emitted spectra and said spatial position of said measured locations to data processor; and
    e) determining the dose or dose rate at one or more selected locations from a calculated total gamma ray energy incident on the one or more selected locations arising from the emitted spectrum of the one or more sources, wherein the measured spectra is divided into a series of energy ranges or bins, the count rates or counts falling within a range or bin are summed to give a total count rate or total count for that range or bin, the series of energy ranges or bins including a highest energy range or bin, where the highest energy range or bin is analyzed first, the analysis involving subtracting from the ranged or binned spectrum a value, the value being based on a response function multiplied by a variable factor to reduce the range or bin under analysis to zero.

2. A method according to claim 1 in which a highest remaining energy bin still contributing to the measured spectrum after subtraction is analyzed next, the process being repeated to reduce all the energy bins of the measured spectrum to zero.

3. A method according to claim 1 in which a bin has a value and the variable factor is adjusted to equate the variable factor multiplied by the response function to the value of the bin under analysis.

4. A method according to claim 1 in which analysis results in one or more emission energy values and an intensity value for each emission energy value, the analysis results being considered as the emitted spectra.

5. A method according to claim 1 further comprising inputting said spatial positions and said emitted spectra associated with said spatial positions to a computer model of the environment under analysis.

6. A method according to claim 1 in which the method uses a model to determine at least one selected from the group consisting of dose and dose rates based at least in part on calculation of at least one of the behavior and effect of a large number of photons from each gamma emitting source according to characteristics of each gamma emitting source.

7. A method according to claim 1 in which the method uses a model to provide at least one selected from the group consisting of visualization of the environment, source locations, source types and diagnostic information on the gamma emitting source.

8. A method according to claim 1 in which the method uses a model to account for at least one selected from the group consisting of shape, relative position, shielding effect, attenuating effect, dissipating effect, first order scattering effect and second order scattering effect of the components of the environment.

9. A method according to claim 1 in which the dose or dose rate at a selected location is determined by summing the contribution of all source locations emitted spectra to said selected location.

10. A method according to claim 1 in which the dose rate calculated for a plurality of selected locations within the environment is used to generate contour or other plots of dose rate over a part or the whole of the environment.

11. A method according to claim 1 in which a gamma detector analyses a measured location within the environment and then analyses further measured locations within the environment according to a detector scan, with more measured locations being sampled at or towards the equator of the detector scan than at or towards the poles of the detector scan.

12. A method according to claim 11 in which a tilt and pan movement is provided for the gamma detector, and the number of analyzed locations in the pan direction at varying tilt angles is proportional to at least one of the cosine of the tilt angle and the number of analyzed locations in the pan direction, at a given tilt angle, varies from a maximum at the equator to one or zero locations at the pole or poles.

13. A method according to claim 1 in which the measured location position is determined in three dimensions, the measured location being determined by the tilt and pan position of a gamma detector and in terms of the measured location's distance from the gamma detector.

14. A method for determining dose or dose rate for one or more selected locations within an environment, comprising the steps of:
   a) measuring incident gamma ray energy and count rate from one or more sources, for one or more viewed portions of the environment, at one or more measured locations within the environment to obtain one or more measured spectra for said measured locations;
   b) measuring the spatial position of each of said measured locations;
   c) determining an emitted spectrum for each said viewed portion of the environment from said measured spectrum for each said viewed portion of the environment;
   d) inputting the emitted spectra and said spatial position of said measured locations to data processor; and
   e) determining the dose or dose rate at one or more selected locations from a calculated total gamma ray energy incident on the one or more selected locations arising from the emitted spectrum of the one or more sources, wherein one or more of said selected locations are different from any of said measured locations, wherein an energy bin is analyzed by subtracting from a ranged or binned measured spectra a value based on a response function multiplied by a variable factor to reduce the bin under analysis to zero.

15. A dose or dose rate determining apparatus for one or more selected locations within an environment, the apparatus comprising:
   a) means for measuring incident gamma ray energy and count rate from one or more sources, for one or more viewed portions of the environment at one or more viewed portions within the environment, the apparatus obtaining a measured spectrum for one or more viewed portions from this incident gamma ray energy and count rate information;
   b) means for measuring the spatial position of said one or more viewed portions;
   c) calculating means for determining an emitted spectrum for each viewed portion of the environment from said measured spectrum for each said viewed portion of the environment;
   d) processing means adapted to receive inputs corresponding to the emitted spectra and the spatial position; and
   e) calculating means for determining the dose or dose rate at one or more selected locations from a total calculated gamma ray energy incident on those selected location arising from the emitted spectrum of the one or more sources, wherein the calculating means for determining an emitted spectrum divide the measured spectrum into a series of energy ranges or bins, sum the count rates or counts falling within a range or bin to give a total count rate or total count for that range or bin, the series of energy ranges or bins including a highest energy range or bin, the calculating means for determining an emitted spectrum analyzing by subtracting from the ranged or binned spectrum a value, the value being based on a response function multiplied by a variable factor to reduce the range or bin under analysis to zero.

16. A method for determining a radiation dose rate for a selected location within an environment, the method comprising:
   measuring incident gamma ray energy and count rate for one or more measured locations within the environment to obtain a measured spectrum for the measured locations;
   measuring the spatial position of the measured locations;
   determining an emitted spectrum for the measured locations based at least in part on the measured spectrum;
   determining the dose rate at at least one selected location that is distinct from the measured locations based at least in part on the emitted spectrum that has been determined for the measured locations; and
   wherein the measured spectra is divided into a series of energy ranges or bins, the count rates falling within each range or bin summed together to give a total count for each bin, the range or binned measured spectrum having a highest energy level bin, said highest energy level bin analyzed first by subtracting from the range or binned measured spectrum a value based on a response function multiplied by a variable factor to reduce the bin under analysis to zero, a highest remaining energy bin still contributing to the range or binned measured spectrum after subtraction is analyzed next, and wherein the analyzing process is sequentially repeated to reduce the ranged or binned spectrum to zero.

* * * * *